United States Patent
Dahan et al.

(10) Patent No.: US 10,025,839 B2
(45) Date of Patent: Jul. 17, 2018

(54) DATABASE VIRTUALIZATION

(71) Applicant: CA, Inc., Islandia, NY (US)

(72) Inventors: Jean-David Dahan, Cedar Park, TX (US); James Stephen Kress, Double Oak, TX (US)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 14/093,366

(22) Filed: Nov. 29, 2013

(65) Prior Publication Data

US 2016/0125052 A1 May 5, 2016

(51) Int. Cl.
G06F 7/00 (2006.01)
G06F 17/30 (2006.01)

(52) U.S. Cl.
CPC .............. *G06F 17/30566* (2013.01)

(58) Field of Classification Search
CPC ......... G06F 17/30566; G06F 17/30235; G06F 9/455
USPC ......... 707/802, 805, 712, 781, 782, 999.003
See application file for complete search history.

(56) References Cited

U.S. PATENT DOCUMENTS

| | | |
|---|---|---|
| 5,345,587 A | 9/1994 | Fehskens et al. |
| 5,450,586 A | 9/1995 | Kuzara et al. |
| 5,485,618 A | 1/1996 | Smith |
| 5,576,965 A | 11/1996 | Akasaka et al. |
| 5,581,696 A | 12/1996 | Kolawa et al. |
| 5,642,511 A | 6/1997 | Chow |
| 5,798,757 A | 8/1998 | Smith |
| 5,867,707 A | 2/1999 | Nishida et al. |
| 5,956,479 A | 9/1999 | McInerney et al. |
| 5,958,008 A | 9/1999 | Pogrebisky et al. |
| 5,999,988 A | 12/1999 | Pelegri-Llopart et al. |
| 6,002,871 A | 12/1999 | Duggan et al. |
| 6,038,395 A | 3/2000 | Chow |
| 6,061,721 A | 5/2000 | Ismael et al. |
| 6,112,238 A | 8/2000 | Boyd et al. |
| 6,122,627 A | 9/2000 | Carey et al. |
| 6,134,540 A | 10/2000 | Carey et al. |
| 6,134,581 A | 10/2000 | Ismael et al. |
| 6,144,962 A | 11/2000 | Weinberg et al. |

(Continued)

FOREIGN PATENT DOCUMENTS

EP 869433 10/1998

OTHER PUBLICATIONS

Wikipedia, "Mock Object," Sep. 23, 2008, printed May 31, 2009, http://en.wikipedia.org/wiki/Mock_object, pp. 1-5.

(Continued)

*Primary Examiner* — Mohammed R Uddin
(74) *Attorney, Agent, or Firm* — Alliance IP, LLC

(57) ABSTRACT

Frame data is received from an agent instrumented on a software component, the frame data describing a particular request from the software component to a database access component intercepted at the agent. The particular request corresponds to a transaction involving a database and the software component can interface with the database using the database access component. A service mode is identified that corresponds to the transaction and virtualization data is generated based on the service model and the particular request. The virtualization data is sent to the agent that describes a virtualized response to be provided by the agent to the software component as a response to the particular request.

29 Claims, 14 Drawing Sheets

(56) References Cited

U.S. PATENT DOCUMENTS

| | | | |
|---|---|---|---|
| 6,189,138 B1 | 2/2001 | Fowlow et al. | |
| 6,230,309 B1 | 5/2001 | Turner et al. | |
| 6,249,882 B1 | 6/2001 | Testardi | |
| 6,292,827 B1* | 9/2001 | Raz | H04L 29/06 709/217 |
| 6,353,840 B2 | 3/2002 | Saito et al. | |
| 6,408,430 B2 | 6/2002 | Gunter et al. | |
| 6,427,230 B1 | 7/2002 | Goiffon et al. | |
| 6,442,541 B1* | 8/2002 | Clark et al. | |
| 6,463,578 B1 | 10/2002 | Johnson | |
| 6,473,707 B1 | 10/2002 | Grey | |
| 6,490,719 B1 | 12/2002 | Thomas | |
| 6,557,011 B1 | 4/2003 | Sevitsky et al. | |
| 6,558,431 B1 | 5/2003 | Lynch et al. | |
| 6,587,969 B1 | 7/2003 | Weinberg et al. | |
| 6,601,018 B1 | 7/2003 | Logan | |
| 6,601,020 B1 | 7/2003 | Myers | |
| 6,637,020 B1 | 10/2003 | Hammond | |
| 6,662,188 B1 | 12/2003 | Rasmussen et al. | |
| 6,668,371 B2 | 12/2003 | Hamilton et al. | |
| 6,684,387 B1 | 1/2004 | Acker et al. | |
| 6,785,882 B1 | 8/2004 | Goiffon et al. | |
| 6,792,426 B2 | 9/2004 | Baumeister et al. | |
| 6,810,368 B1 | 10/2004 | Pednault | |
| 6,826,716 B2 | 11/2004 | Mason | |
| 6,851,118 B1 | 2/2005 | Ismael et al. | |
| 6,879,946 B2 | 4/2005 | Rong et al. | |
| 6,883,162 B2 | 4/2005 | Jackson et al. | |
| 6,895,578 B1 | 5/2005 | Kolawa et al. | |
| 6,912,520 B2 | 6/2005 | Hankin et al. | |
| 6,920,609 B1 | 7/2005 | Manber et al. | |
| 6,941,298 B2 | 9/2005 | Chow et al. | |
| 6,957,199 B1 | 10/2005 | Fisher | |
| 7,055,137 B2 | 5/2006 | Mathews | |
| 7,065,745 B2 | 6/2006 | Chan | |
| 7,080,303 B2 | 7/2006 | Bowers | |
| 7,149,734 B2 | 12/2006 | Carlson et al. | |
| 7,174,536 B1 | 2/2007 | Kothari et al. | |
| 7,240,328 B2 | 7/2007 | Beckett et al. | |
| 7,310,777 B2 | 12/2007 | Cirne | |
| 7,340,191 B2 | 3/2008 | Robinson et al. | |
| 7,340,481 B1 | 3/2008 | Baer et al. | |
| 7,343,587 B2 | 3/2008 | Moulden et al. | |
| 7,350,191 B1 | 3/2008 | Kompella et al. | |
| 7,376,549 B2 | 5/2008 | Horikawa | |
| 7,392,506 B2 | 6/2008 | Garcowski et al. | |
| 7,392,507 B2 | 6/2008 | Kolawa et al. | |
| 7,401,141 B2 | 7/2008 | Carusi et al. | |
| 7,437,710 B2 | 10/2008 | Bau et al. | |
| 7,487,508 B2 | 2/2009 | Fu et al. | |
| 7,512,840 B2 | 3/2009 | Martin et al. | |
| 7,539,980 B1 | 5/2009 | Bailey et al. | |
| 7,552,036 B2 | 6/2009 | Oslake et al. | |
| 7,562,255 B2 | 7/2009 | El Far et al. | |
| 7,676,538 B2 | 3/2010 | Potter et al. | |
| 7,694,181 B2 | 4/2010 | Noller et al. | |
| 7,721,265 B1 | 5/2010 | Xu et al. | |
| 7,730,030 B1* | 6/2010 | Xu | 707/617 |
| 7,783,613 B2 | 8/2010 | Gupta et al. | |
| 7,784,045 B2 | 8/2010 | Bowers | |
| 7,805,496 B2 | 9/2010 | Aiber et al. | |
| 7,827,527 B1 | 11/2010 | Chiluvuri | |
| 7,873,594 B2 | 1/2011 | Harada et al. | |
| 7,913,230 B2 | 3/2011 | Vikutan | |
| 7,966,183 B1 | 6/2011 | Kryskow et al. | |
| 8,028,272 B2 | 9/2011 | Eldridge et al. | |
| 8,060,864 B1 | 11/2011 | Michelsen | |
| 8,112,262 B1* | 2/2012 | Michelsen | 703/13 |
| 8,117,591 B1 | 2/2012 | Michelsen | |
| 8,146,057 B1 | 3/2012 | Michelsen | |
| 8,346,732 B1* | 1/2013 | Nasre | 707/674 |
| 8,392,884 B2 | 3/2013 | Specchio et al. | |
| 8,538,740 B2 | 9/2013 | Kumar et al. | |
| 8,543,379 B1 | 9/2013 | Michelsen | |
| 8,555,274 B1* | 10/2013 | Chawla et al. | 718/1 |
| 8,589,343 B2* | 11/2013 | Solin | 707/615 |
| 8,612,994 B1* | 12/2013 | Sanderson | 719/313 |
| 8,626,967 B1* | 1/2014 | Naik et al. | 710/38 |
| 8,826,230 B1 | 9/2014 | Michelsen | |
| 8,898,681 B1 | 11/2014 | Acheff et al. | |
| 8,935,573 B2 | 1/2015 | Horsman et al. | |
| 8,938,808 B1* | 1/2015 | Spertus | G06F 21/10 705/51 |
| 9,015,668 B1* | 4/2015 | Michelsen | 717/124 |
| 9,111,019 B2 | 8/2015 | Michelsen et al. | |
| 9,128,694 B1 | 9/2015 | Michelsen | |
| 9,201,767 B1 | 12/2015 | Tarlton et al. | |
| 9,323,645 B2 | 4/2016 | Michelsen | |
| 9,378,118 B2 | 6/2016 | Michelsen | |
| 9,417,990 B2 | 8/2016 | Michelsen | |
| 9,531,609 B2 | 12/2016 | Talot et al. | |
| 9,563,546 B2 | 2/2017 | Michelsen | |
| 9,727,314 B2 | 8/2017 | Michelsen et al. | |
| 2002/0010781 A1 | 1/2002 | Tuatini | |
| 2002/0095291 A1 | 7/2002 | Sumner | |
| 2002/0143764 A1* | 10/2002 | Martin et al. | 707/8 |
| 2003/0009433 A1 | 1/2003 | Murren et al. | |
| 2003/0014216 A1 | 1/2003 | Lebow | |
| 2003/0046663 A1 | 3/2003 | Rogers et al. | |
| 2003/0051194 A1 | 3/2003 | Cabezas et al. | |
| 2003/0055670 A1 | 3/2003 | Kryskow et al. | |
| 2003/0078949 A1 | 4/2003 | Scholz et al. | |
| 2003/0081003 A1 | 5/2003 | Kutay et al. | |
| 2003/0163608 A1 | 8/2003 | Tiwary et al. | |
| 2003/0217162 A1 | 11/2003 | Fu et al. | |
| 2004/0025083 A1 | 2/2004 | Nanja | |
| 2004/0039993 A1 | 2/2004 | Kougiouris et al. | |
| 2004/0068560 A1 | 4/2004 | Oulu et al. | |
| 2004/0078782 A1 | 4/2004 | Clement et al. | |
| 2004/0123272 A1 | 6/2004 | Bailey et al. | |
| 2004/0128259 A1 | 7/2004 | Blakeley et al. | |
| 2004/0162778 A1 | 8/2004 | Kramer et al. | |
| 2004/0194064 A1 | 9/2004 | Ranjan et al. | |
| 2004/0225919 A1 | 11/2004 | Reissman et al. | |
| 2004/0230674 A1 | 11/2004 | Pourheidari et al. | |
| 2004/0237066 A1 | 11/2004 | Grundy et al. | |
| 2004/0243334 A1 | 12/2004 | Wrigley et al. | |
| 2004/0243338 A1 | 12/2004 | Sabiers et al. | |
| 2005/0027648 A1 | 2/2005 | Knowles et al. | |
| 2005/0039190 A1* | 2/2005 | Rees et al. | 719/316 |
| 2005/0063335 A1 | 3/2005 | Shenfield et al. | |
| 2005/0097515 A1 | 5/2005 | Ribling | |
| 2005/0198401 A1 | 9/2005 | Chron et al. | |
| 2005/0223365 A1 | 10/2005 | Smith et al. | |
| 2005/0259682 A1* | 11/2005 | Yosef et al. | 370/468 |
| 2005/0289231 A1 | 12/2005 | Harada et al. | |
| 2006/0048100 A1 | 3/2006 | Levy et al. | |
| 2006/0059169 A1 | 3/2006 | Armishev | |
| 2006/0129992 A1 | 6/2006 | Oberholtzer et al. | |
| 2006/0167970 A1* | 7/2006 | Seeley | G06F 11/3419 709/202 |
| 2006/0206870 A1 | 9/2006 | Moulden et al. | |
| 2006/0224375 A1 | 10/2006 | Barnett et al. | |
| 2006/0235675 A1 | 10/2006 | Oslake et al. | |
| 2006/0265475 A9 | 11/2006 | Mayberry et al. | |
| 2007/0006177 A1 | 1/2007 | Aiber et al. | |
| 2007/0033442 A1 | 2/2007 | Tillmann et al. | |
| 2007/0073682 A1 | 3/2007 | Adar et al. | |
| 2007/0089107 A1* | 4/2007 | Squires et al. | 717/162 |
| 2007/0169003 A1 | 7/2007 | Branda et al. | |
| 2007/0261035 A1 | 11/2007 | Duneau | |
| 2007/0277158 A1 | 11/2007 | Li et al. | |
| 2008/0010074 A1 | 1/2008 | Brunswig et al. | |
| 2008/0031235 A1* | 2/2008 | Harris et al. | 370/389 |
| 2008/0034418 A1* | 2/2008 | Venkatraman et al. | 726/15 |
| 2008/0120129 A1 | 5/2008 | Seubert et al. | |
| 2008/0127093 A1 | 5/2008 | Fernandez-Ivern et al. | |
| 2008/0262797 A1 | 10/2008 | Carusi et al. | |
| 2009/0064149 A1 | 3/2009 | Singh et al. | |
| 2009/0094684 A1 | 4/2009 | Chinnusamy et al. | |
| 2009/0119301 A1 | 5/2009 | Cherkasova et al. | |
| 2009/0187534 A1 | 7/2009 | Broll et al. | |
| 2009/0204669 A1 | 8/2009 | Allan | |
| 2009/0234710 A1 | 9/2009 | Hassine et al. | |

(56) References Cited

U.S. PATENT DOCUMENTS

| | | | |
|---|---|---|---|
| 2009/0282403 | A1 | 11/2009 | Poole et al. |
| 2009/0298458 | A1 | 12/2009 | Bakker et al. |
| 2010/0037100 | A1 | 2/2010 | Lopian |
| 2010/0145962 | A1 | 6/2010 | Chen et al. |
| 2010/0318974 | A1 | 12/2010 | Hrastnik et al. |
| 2010/0318992 | A1* | 12/2010 | Kushwaha et al. ............ 718/1 |
| 2011/0153581 | A1* | 6/2011 | Kass ............................ 707/705 |
| 2012/0054744 | A1* | 3/2012 | Singh et al. ..................... 718/1 |
| 2012/0059868 | A1 | 3/2012 | Buckl et al. |
| 2012/0066681 | A1* | 3/2012 | Levy ................. G06F 9/5027 718/1 |
| 2012/0084754 | A1 | 4/2012 | Ziegler et al. |
| 2014/0108589 | A1 | 4/2014 | Dhanda |
| 2014/0214886 | A1* | 7/2014 | Annapragada et al. ...... 707/769 |
| 2014/0223418 | A1 | 8/2014 | Michelsen et al. |
| 2014/0310392 | A1 | 10/2014 | Ho |
| 2015/0052521 | A1 | 2/2015 | Raghu |
| 2015/0193226 | A1 | 7/2015 | Michelsen |
| 2015/0205699 | A1 | 7/2015 | Michelsen |
| 2015/0205700 | A1 | 7/2015 | Michelsen |
| 2015/0205701 | A1 | 7/2015 | Michelsen |
| 2015/0205702 | A1 | 7/2015 | Michelsen |
| 2015/0205703 | A1 | 7/2015 | Michelsen |
| 2015/0205704 | A1 | 7/2015 | Michelsen |
| 2015/0205706 | A1 | 7/2015 | Michelsen |
| 2015/0205708 | A1 | 7/2015 | Michelsen |
| 2015/0205709 | A1 | 7/2015 | Michelsen et al. |
| 2015/0205712 | A1 | 7/2015 | Michelsen |
| 2015/0205713 | A1 | 7/2015 | Michelsen |
| 2015/0286560 | A1 | 10/2015 | Michelsen |
| 2016/0140023 | A1 | 5/2016 | Michelsen |
| 2016/0197803 | A1 | 7/2016 | Talbot et al. |
| 2016/0217159 | A1 | 7/2016 | Dahan et al. |
| 2016/0239409 | A1 | 8/2016 | De Oliveira Staudt et al. |
| 2016/0259627 | A1 | 9/2016 | Michelsen et al. |

OTHER PUBLICATIONS

LISA, 2.0 User's Guide, Interactive TKO, Feb. 27, 2003, pp. 1-130.

LISA, 2.0 Developer's Guide, Interactive TKO, Mar. 13, 2003, pp. 1-23.

Chapter 5—Service Discovery, Bluetooth Application Developer's Guide, 2002 (pp. 167-209).

Chatterjee, S., "Messaging Patterns in Service-Oriented Architecture, Part 1," msdn.microsoft.com/en-us/library/aa480027.aspx, Apr. 2004, (pp. 1-21).

Time to live—Wikipedia, the free encyclopedia; 2015; pp. 1-3. http://en.wikipedia.org/wikiiTime_to_Live>, examiner annotated document.

Andrews et al., "Tool Support for Randomized Unit Testing," available online at URL <http://delivery.acm.org/10.1145/1150000/1145741/p36-andrews.pdf>, Jul. 2006 (pp. 36-45).

Saff et al., "Automatic Test Factoring for Java," available online at URL <http://delivery.acm.org/10.1145/1110000/1101927/p114-saff.pdf>, Nov. 2002 (pp. 114-123).

Liu, Chang, "Platform-Independent and Tool-Neutral Test Descriptions for Automated Software Testing," ISCE 2000 available online at URL: <http://delivery.acm.org/10.1145/340000/337598/p713-liu.pdf>, (Pub Date 2000) (3 pages).

OASIS, "ebXML Test Framework DRAFT Document—Version 0.91," Dec. 2002, The Organization for the Advancement of Structured Information Standards, 92 pages.

Microsoft® Office, "FrontPage 2003 Product Guide," © 2003 Microsoft Corporation.

Robillard, M., "Representing Concerns in Source Code," available online at <http://www.cs.ubc.ca/grads/resources/thesis/May04/Martin_Robillard.pdf> Nov. 2003 (139 pages).

Sagar, "Reflection & Introspection: Objects Exposed," Java developers' Journal, May 1, 1998, (pp. 1-16).

Doucet, et al., "Introspection in System-Level Language Frameworks: Meta-Level vs. Integrated," available online at <http://delivery.acm.org/10.1145/1030000/1022756/187010382.pdf>. Mar. 2003 (pp. 1-6).

Beltrame et al., "Exploiting TLM and Object Introspection for System-Level Simulation," available online at <http://delivery.acm.org/10.1145/1140000/1131515/p100-beltranne.pdf>, Mar. 2006 (pp. 100-105).

Wright, et al., "Introspection of Java™ Virtual Machine Under Simulation," available online at <http://delivery.acm.org/10.1145/1700000/1698148/smli_tr-2006-159.pdf>. Jan. 2006 (pp. 1-26).

Web Discussion: "Is TCP protocol stateless or not?" available online at "http://stackoverflow.com/questions/19899236/is-tcp-protocol-statelessor-not" pp. 1-3 (2013).

Yang et al., "Perracotta: Mining Temporal API Rules from Imperfect Traces", ICSE'06 May 20-28, 2006, Shanghai, China (Copyright 2006) 10 pages.

* cited by examiner

| SERVICE MODEL 300 | | | |
|---|---|---|---|
| 301(A) TRANSACTION | COMMAND 311 | OBSERVED ATTRIBUTE(S) 321(1) | OBSERVED CHARACTERISTIC(S) 331(1) | OBSERVED RESPONSE 341(1) |
| 301(B) TRANSACTION | COMMAND 311 | OBSERVED ATTRIBUTE(S) 321(2) | OBSERVED CHARACTERISTIC(S) 331(2) | OBSERVED RESPONSE 341(2) |
| 301(n+1) TRANSACTION | COMMAND 311 | UNKNOWN ATTRIBUTE(S) 321(n+1) | DEFAULT CHARACTERISTIC(S) 331(n+1) | DEFAULT RESPONSE 341(n+1) |
| 302(A) TRANSACTION | COMMAND 312 | OBSERVED ATTRIBUTE(S) 322(1) | OBSERVED CHARACTERISTIC(S) 332(1) | OBSERVED RESPONSE 342(1) |
| 302(B) TRANSACTION | COMMAND 312 | USER-SPECIFIED ATTRIBUTE(S) 322(2) | USER-SPECIFIED CHARACTERISTIC(S) 332(2) | USER-SPECIFIED RESPONSE 342(2) |
| 302(m+1) TRANSACTION | COMMAND 312 | UNKNOWN ATTRIBUTE(S) 322(m+1) | DEFAULT CHARACTERISTIC(S) 332(m+1) | DEFAULT RESPONSE 342(m+1) |
| 303 TRANSACTION | UNKNOWN COMMAND 313 | UNKNOWN ATTRIBUTE(S) 323 | DEFAULT CHARACTERISTIC(S) 333 | DEFAULT RESPONSE 343 |

FIG. 3

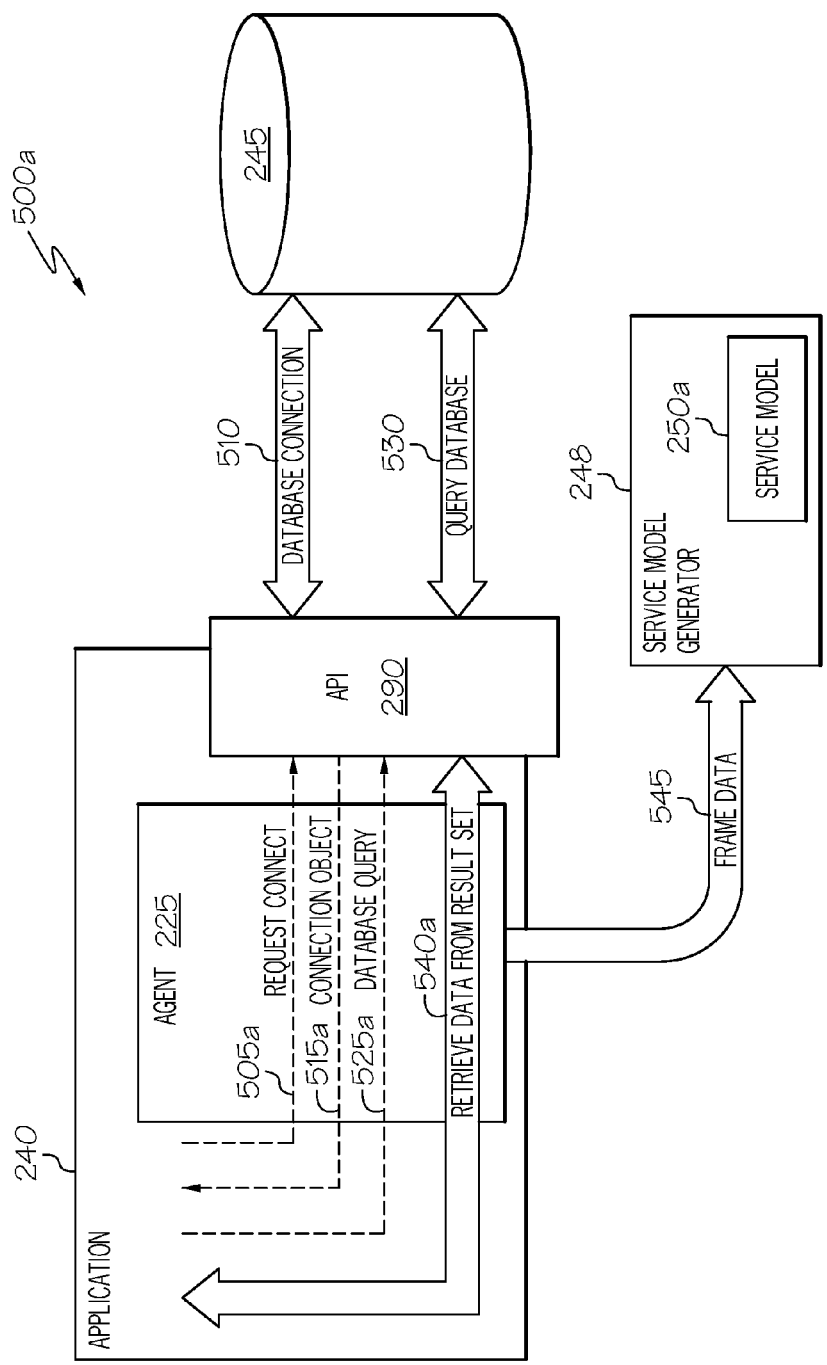

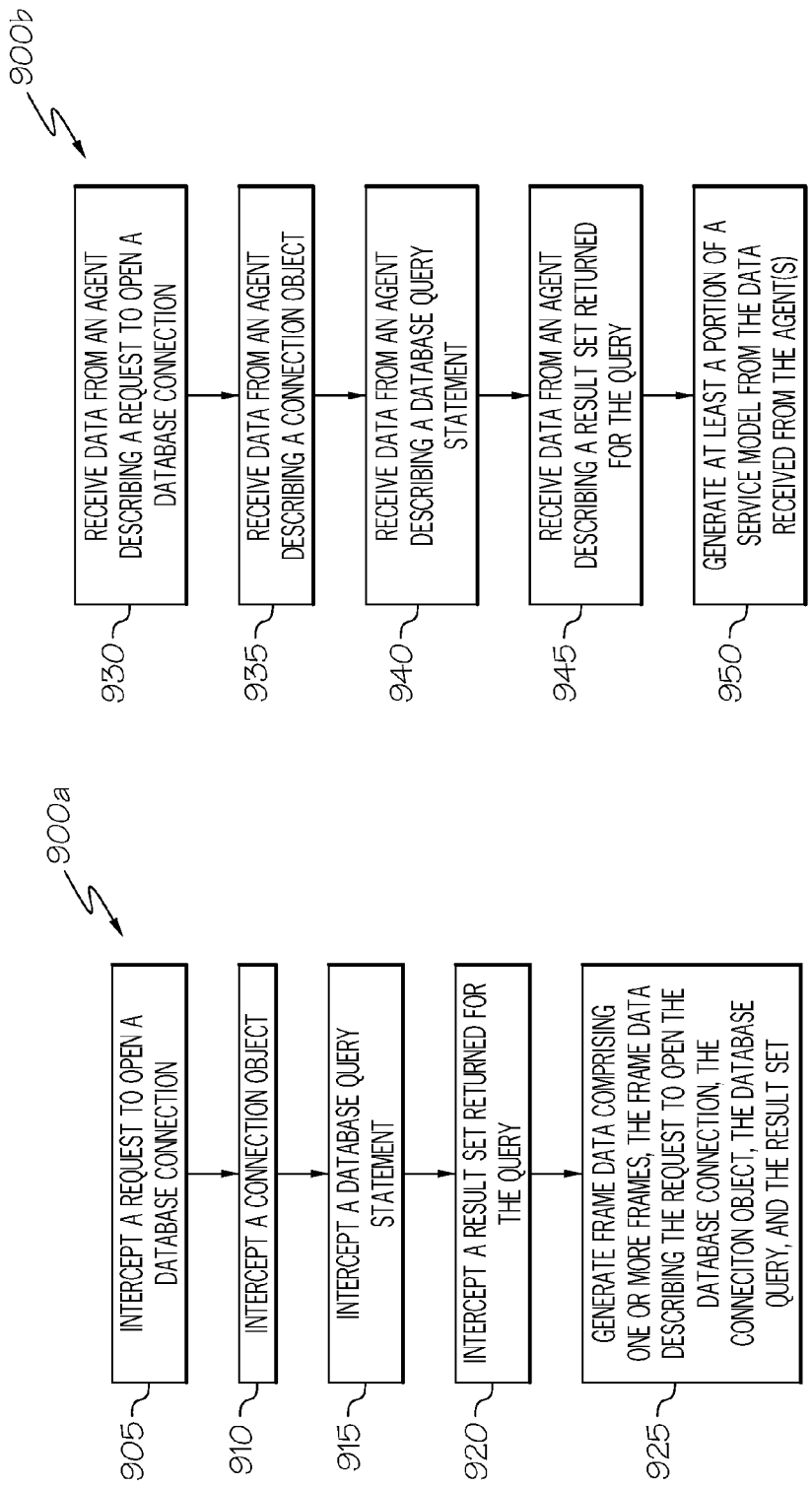

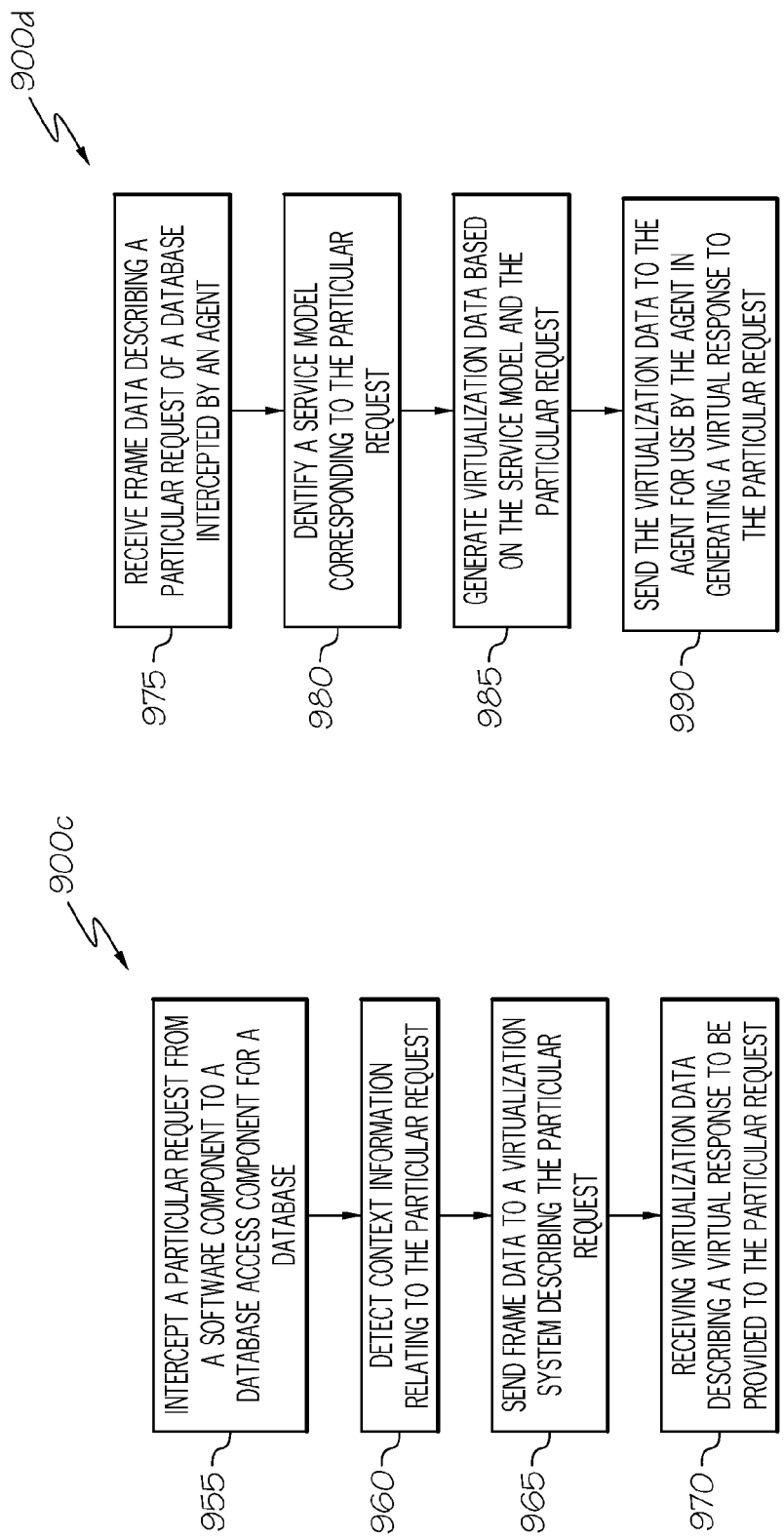

DATABASE VIRTUALIZATION

BACKGROUND

The present disclosure relates in general to the field of computer development, and more specifically, to software development involving coordination of mutually-dependent constrained systems.

Modern software systems often include multiple programs or applications working together to accomplish a task or deliver a result. For instance, a first program can provide a front end with graphical user interfaces with which a user is to interact. The first program can consume services of a second program, including resources of one or more databases, or other programs or data structures. Databases continue to be an important component in modern applications, including web-based applications and websites that generate dynamic content from one or more databases that it can then provide to the user through the graphical user interfaces, among other examples. In some cases, multiple interoperating programs or databases can be controlled or developed by a single entity, such as a single enterprise, publisher, or developer. In other instances, interoperating programs and databases can be developed and controlled by different parties. In some cases, access to a system component, such as a database, can be constrained in connection with the testing or development of the program (or constituent components) that are to interoperate with the other component, for instance, when the database is a live production database and cannot be conveniently brought offline, is owned or controlled by a third party, or is, itself, under development.

BRIEF SUMMARY

According to one aspect of the present disclosure, a particular request from a software component to a database access component can be intercepted at an agent, where the particular request corresponds to a transaction involving a database and the software component interfaces with the database using the database access component. Frame data can be sent to a virtualization system describing the particular request. Virtualization data can be received that describes a virtualized response to provide to the software component that is responsive to the particular request.

Further, according to one aspect of the present disclosure, frame data can be received from an agent instrumented on a software component, the frame data describing a particular request from the software component to a database access component intercepted at the agent. The particular request can correspond to a transaction involving a database and the software component can interface with the database using the database access component. A service mode can be identified that corresponds to the transaction and virtualization data can be generated based on the service model and the particular request. The virtualization data can be sent to the agent that describes a virtualized response to be provided by the agent to the software component as a response to the particular request.

BRIEF DESCRIPTION OF THE DRAWINGS

FIG. 3 is a simplified block diagram illustrating an example service model in accordance with at least one embodiment;

FIGS. 5A-5B are simplified block diagrams representing example interactions of a virtual service engine with an agent corresponding to the virtualization of a database in accordance with at least one embodiment;

FIGS. 9A-9D are simplified flowcharts illustrating example techniques in connection with virtualization of a database in accordance with at least one embodiment.

Like reference numbers and designations in the various drawings indicate like elements.

DETAILED DESCRIPTION

Figure 1:
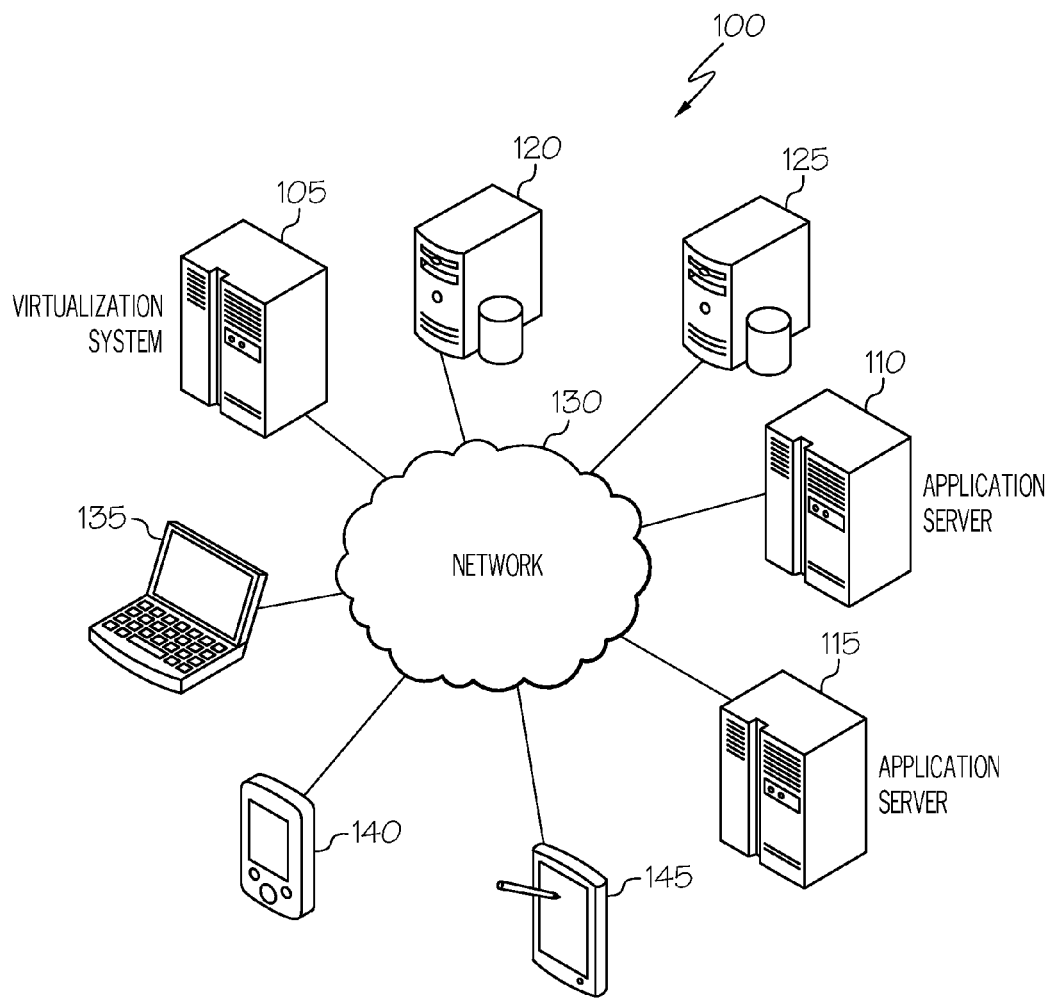
FIG. 1 is a simplified schematic diagram of an example computing system including an example virtualization system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a simplified block diagram is shown illustrating an example computing environment 100 including a virtualization system 105, one or more application server systems (e.g., 110, 115), and one or more database systems (e.g., 120, 125). Virtualization system 105 can be utilized to virtualize databases hosted by the database systems 120, 125 using agents instrumented on software components of applications, or other software programs, hosted by the application servers 110, 115. Virtual service models can be generated corresponding to a database and applications' interactions with the database. A virtual service can be provided based on the virtual service model that simulates a database's (and the corresponding database management system's) responses to connection attempts, queries, and other messages received from the application. The virtualized database can be used in place of the real world database, for instance, when the database is offline, allows limited access (e.g., the database is managed or owned by a third party), under development or repair, or is otherwise unavailable, allowing software components dependent on the database to still be executed, tested, developed, etc. against the simulations provided by the virtualized database.

Virtual service models can be based on transactions between applications (e.g., hosted by application servers 110, 115) and databases (e.g., hosted by database systems 120, 125). The transactions can be recorded to identify patterns and behaviors relating to how the database responds to particular messages received from the applications. Such transactions can include transaction fragments, with each fragment including one or more requests and one or more corresponding responses. Such requests and responses can be transmitted as messages, in some cases, sent over one or more networks (e.g., 130) between application server and database system, among other examples.

Computing environment 100 can further include one or more user computing devices 135, 140, 145 that can be used to allow users to interface with and consume resources of virtualization system 105, application servers 110, 115, and/or database systems 120, 125. For instance, administrator users can instrument software components, manage recording of transactions between applications and databases, administer the generation of corresponding virtual services, and perform other tasks using computing device 135, 140, 145 in connection with the generation and use of virtual service models operable for use in virtualizing databases served by database systems 120, 125, among other potential uses.

In general, "servers," "clients," "computing devices," "network elements," "database systems," "user devices," and "systems," etc. (e.g., 105, 110, 115, 120, 125, 135, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 125, 135, 140, 145, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a virtualization system 105, application server 110, 115, database system, or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

There are many inherent difficulties in virtualizing databases. Modern databases and database code include a large amount of setup and machinery. Further, interactions with databases can be complicated, including a high quantity of APIs and corresponding database calls performed in even the simplest scenarios. Further, modern software environments can be particular complex with potentially multi-threaded, multi-user and even multi-virtual machine environments making it difficult to record database transactions in such a way that the many message corresponding to a single transaction or group of related transactions (or conversation) are able to be identified.

In some instances, virtualization can be achieved utilizing agents instrumented within a software component (or virtual machine in which the software component is executed). The agents can record and replay software interactions involving the database. Other approaches can attempt to record transactions on the wire by monitoring messages sent over a network, however, virtualizations based on monitored network traffic can be jeopardized in instances where the traffic is encrypted, is in a proprietary binary format or otherwise too complex, where the traffic is routed through a proxy, or where a portion of the subsystem to be virtualized does not directly generate or receive network traffic, among other example issues.

An agent-based approach can be provided that uses bytecode instrumentation techniques to record data generated or received within the application during transactions with a database to be virtualized. The agents can be further used, during virtualization of the database, to "hijack" a transaction from within the application (and/or VM) and simulate data expected for such interactions with the database In some cases, drivers or other defined APIs, can be used in connection with a software component's interaction with a database. For instance, Java virtual machines can use a Java Database Connectivity (JDBC) driver, .NET Common Language Runtime (CLR) can use ADO.NET, OLDEDB, ODBC drivers, among other examples. Such drivers and APIs can include a defined set of interfaces and classes or methods that any code interfacing with a database are to use. This defined structure can be leveraged in the virtualization of interactions of the software components with databases through these APIs and drivers. For instance, in some instances, patterns enforced by a driver for interacting with a database can follow a template such as:

0) Obtain a handle to a data source and/or transactional connection;
1) Obtain a database connection from the driver;
2) Use the connection to make a SQL statement or stored procedure;
3) Optionally complete the SQL statement by binding variables to it and/or setting optional attributes on it (e.g. timeout);
4) Execute the statement and retrieve scalar or pointer based results (result sets, readers, cursors, etc.); and
5) Move through the pointer-based results to retrieve actual results in code; among other potential examples.

As noted above, database interactions can follow a defined or expected template, and failure to adhere to such schemes can cause exceptions and other errors. For instance, while virtualizing a database's response to a query may be the ultimate deliverable desired in a virtualization of the database, failing to account for accurate virtualization of preceding states and portions, such as virtualization of connection objects and messages (e.g., corresponding to points 0) and 1) above) can cause an exception to be raised in the system, among other issues.

In some instances, agents implemented on software components that interact with a database through a defined driver or API can record database connection data, database query data, binding variables, result sets, type of results (classes), among other data, including context data for use in grouping data relating to common database transactions. This information can be mapped by the agent for use in building a virtual service model so that the statefulness and session-awareness are achieved during virtualization of the database. In some cases, the sequence described above can be virtualized such that the virtual service performs such aspects as:

0) Obtain a handle to a datasource and/or transactional connection;
1) Obtain a database connection from the driver: the agent can return an empty connection object of the right type (the type can be known from initial configuration information for example, so as to avoid VSE round-trips) and remembers the connection data used (CONN→CONN_INFO);
2) Use the connection to make a SQL statement or stored procedure: the agent can return an empty statement object of the right type and remembers the SQL statement text as well as the connection associated with this statement (STMT→SQL and STMT→CONN);
3) Optionally complete the SQL statement by binding variables to it and/or setting optional attributes on it: the agent can remember the value of variables assigned to the statement (SQL→VARS);

4) Execute the statement and retrieve scalar or pointer based results: a VSE frame can be built by the agent containing SQL, VARS and CONN_INFO data since they can now all be looked up from the previous mappings and associated together. Further, during playback, the agent can send such a frame to a virtualization system and the virtualization system can find the corresponding modeled responses and replies with the correct scalars or pointers (e.g., based on previously captured response and reply data). In some implementations utilizing pointers, a fully materialized view behind the pointer can be sent back to the agent to avoid further round trips (i.e., between the virtualization system and agent) when the code iterates on that pointer. The result can also be tracked and mapped by the agent to the response from the virtualization system; and 5) Move through the pointer-based results to retrieve actual results in code.

During virtualization, or playback, of a database, agents can interface with a virtualization system to synthesize responses of the database received from the database driver or API through which the database is accessed. These synthesized responses can be structured so as to be consistent with transactions and transaction fragments defined in virtual service models based on recorded transactions with the actual database. An agent can, in some cases, generate synthesized responses that satisfy minimum expectations of the requesting software component(s) such that the synthesized response is accepted by the requesting component without errors or exceptions resulting. For instance, an agent can always return an object of the correct, or expected, class consistent with the objects that have been observed to have been returned in real transactions. In some cases, the objects may only be hollow instances of the object, such that the object is accepted even when the model is unable to synthesize an exact version of the object as would be returned by the live database through the API or driver. As an example, a piece of code could attempt casting a statement and calling a non-generic method on the statement object being cast, such as:

Statement stmt= . . . ;
((AcmeStatement) stmt).setAcmeTimeout(30).

In this example it can be determined, for instance, from a previous recording, that the expected SQL statement is of class AcmeStatement and, accordingly, the agent can be instructed, during virtualization, to provide just this kind of object such that the receiving software component believes that it is, in fact, interfacing with the actual database, rather than a virtualization of the database, among other potential examples.

In some instances, non-standard method calls may be encountered utilizing data exchanged with an API to a database to be virtualized. For instance, continuing the example above, the non-standard method setAcmeTimeout can be called and the virtual service model can define how to replace the data that would be returned through the APIs with a synthesized result. In cases where returning a hollow statement object would result in exceptions being thrown or other errors, heuristics can be defined and applied to synthesize contents of the object in an acceptable manner. For instance, for methods that return void (i.e., nothing), an agent may be configured to take no action, other than preventing exceptions, to satisfactorily virtualize such a method as all state information for a virtualized object will be contained in the virtual model.

Additionally techniques can be used by the virtualization system to instruct agents how to handle non-standard method calls. For example, for non-void methods, the system can be allowed to attempt to execute the call (without the involvement of the agent) in case the absence of the database (and correspondingly hollow objects) does not cause an exception. If an exception is thrown, however, the agent can catch the exception and fall back to create a synthetic result. These synthetic results can be in some cases based on heuristics or other predictions of the proper form of the response, such as by creating the synthetic response form driver-specific hooks that inform what information is to be returned (e.g. a database version number, etc.), among other examples.

Figure 2:
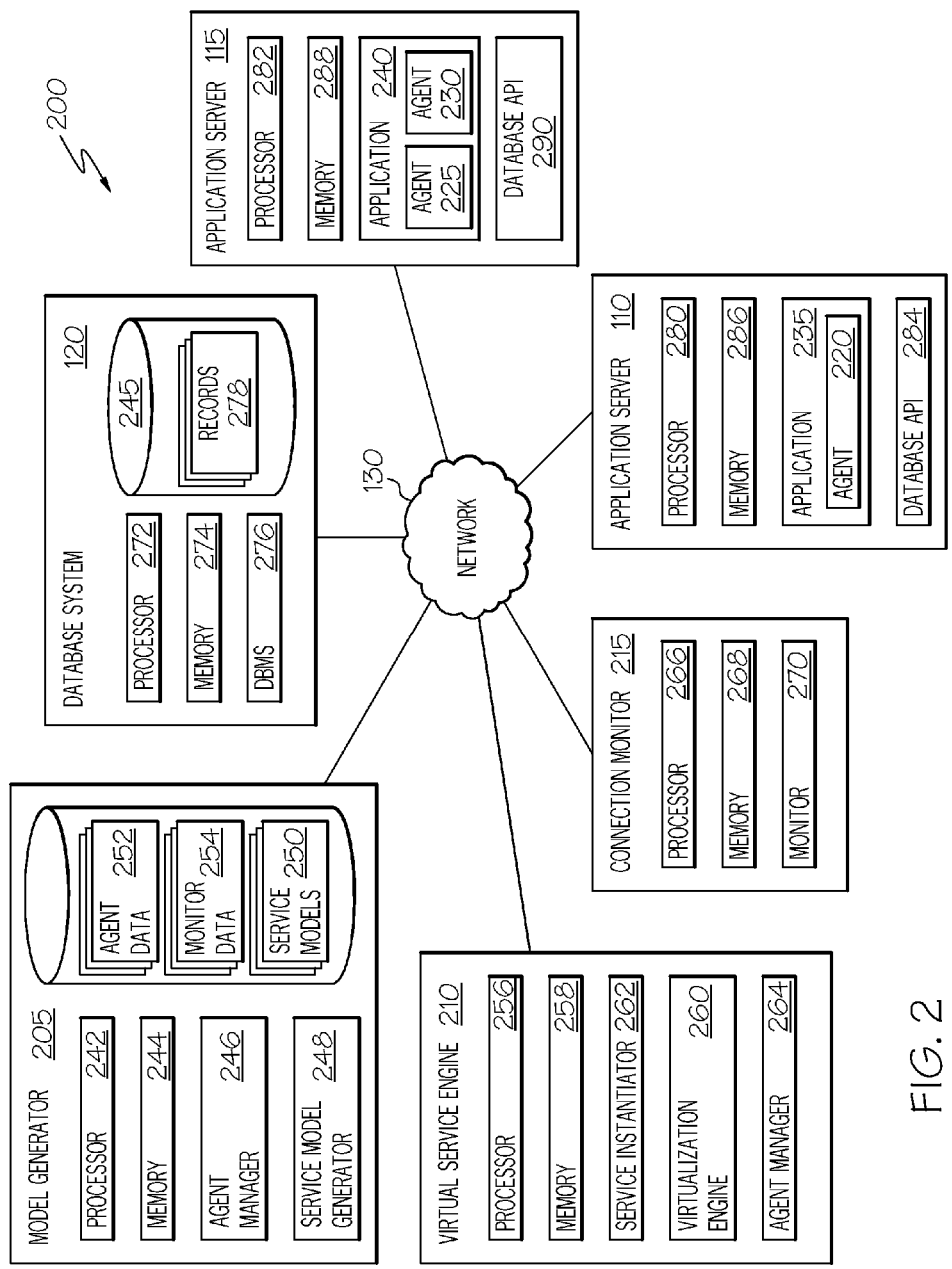
FIG. 2 is a simplified block diagram of an example computing system including an example virtual service engine and an example model generator in accordance with at least one embodiment.

At least some of the systems described in the present disclosure, such as the systems of FIGS. 1 and 2, can include functionality providing at least some of the above-described features that, in some cases, at least partially address at least some of the above-discussed issues, as well as others not explicitly described. For instance, in the example of FIG. 2, a simplified block diagram 200 is shown illustrating an example environment including a model generator 205 adapted to assist in the generation of service models (e.g., 250) that can be deployed to model transactions between one or more software components and a database (e.g., 245), where the software components of an application (e.g., 235, 240) interface with the database 245 through a database driver or API (collectively "database API") (e.g., 284, 290). A virtual service engine 210 can be used to playback, or instantiate a virtual service from virtual service models 250, to virtualize software component(s), including databases (e.g., 245), modeled by the virtual service model. In some cases, the virtual service engine 210 can leverage agents (e.g., 220, 225, 230) instrumented in applications (e.g., 235, 240) that are to interact with the virtual service. In other cases, the virtual service can act to send data to the application consuming the virtual service, as if the data were received from the virtualized software component over a network (e.g., 130), such as described in U.S. Pat. No. 8,112,262 entitled "Service Modeling and Virtualization", incorporated herein by reference in its entirety.

In one example, a model generator 205 can be provided that includes one or more processors 242 and one more memory elements 244 along with other hardware- and software-based components, such as agent manager 246 and service model generator 248. An example agent manager 246 can include functionality for interfacing with one or more agents 220, 225, 230 instrumented in virtual machines, applications, or software components, such as software components involved in transactions involving one or more databases (e.g., 245). Agent manager 246 can manage recording of transactions using deployed agents (e.g., 220, 225, 230). Agents can capture data as it enters or exits the software component including data describing method calls and other requests, and corresponding responses, that are exchanged between the instrumented software component(s) and a database API (e.g., 284, 290) used by the software component (or application, virtual machine, etc.) to interface with databases. Not only can agents capture the contents of requests and responses, but agents can also capture context data, such as session data, connection data, timing data, and other information that can be used to associate various requests and responses together. For instance, an agent may capture multiple messages involving establishing and maintaining connections with a database and querying the database. Further, these messages may pertain to multiple different parallel transactions. Session data maintained by the application or another component, can be captured by the agents allowing the agents to track which requests and responses belong to which connection, session, etc. Agent data 252 collected by the agents can be provided to the model generator 205 for use by the service model generator 248 in generating service models 250 describing the transactions such that portions of these transactions can be accurately simulated in virtualizations of corresponding databases, among other examples.

Instrumentation agents (e.g., 220, 225, 230), or agents, (collectively referred to herein as instrumentation agents) can be software-implemented agents that are configured to provide visibility into the operations of each instrumented component to one or more agent managers provided in connection with a virtualization system. While FIG. 2 shows model generator 205 and virtual service engine 210 as separate subsystems (e.g., of a virtualization system), in some implementations, the functionality described in connection with model generator 205 and virtual service engine 210 can be implemented in a single system. Each instrumentation agent can be configured to detect requests and responses being sent to and from the component in which that agent is embedded. Each agent (e.g., 220, 225, 230) is configured to generate information about the detected requests and/or responses and to report that information to an agent manager (e.g., 246, 264) within, coupled to, or otherwise associated with a virtualization system. Additionally, each agent can be configured to detect and report on activity that occurs internally to the component in which the agent is embedded.

In some cases, there may be a single instrumentation agent per component, while other embodiments may be implemented differently. For example, in some systems, there can be a one-to-one correspondence between the number of instrumentation agents within a component and the number of processes (or other subcomponents) to be monitored within that component. In such embodiments, each instrumentation agent monitors and reports on its corresponding sub-component. In other instances, a single agent can monitor and have visibility into multiple components, among other examples.

Generally, in response to detecting a request, response, and/or other activity to be monitored, each agent (e.g., 220, 225, 230) can be configured to detect one or more characteristics associated with that activity and/or the monitoring of that activity by the agent. The characteristics can include a frame identifier, which identifies a message, with respect to the agent, sent by the agent to the agent manager to report the characteristics; a parent identifier, which identifies the requester that generated the request sent to the component or sub-component monitored by the agent; a transaction identifier, identifying the transaction, with respect to the component or sub-component being monitored; and an agent identifier that identifies the instrumentation agent, with respect to the other instrumentation agents in the system, that is generating the characteristics. Such characteristics can include other information such as a system clock value, current processor and/or memory usage, contents of the request, contents of the response to the request, identity of the requester that generated the request, identity of the responder generating the response to the request, Java virtual machine (JVM) statistics, structured query language (SQL) queries (SQLs), number of database rows returned in a response, logging information (e.g., messages logged in response to a request and/or response), error messages, simple object access protocol (SOAP) requests, values generated by the component that includes the instrumentation agent but that are not returned in the response to the request, web service invocations, EJB method invocations, EJB entity lifecycle events, heap sizing, and the like. Characteristics can also include the thread name of a thread processing the request to generate the response, the class name of the class of an object invoked to process the request to generate the response, a Web Service signature used to contain the request and/or response, arguments provided as part of the request and/or response, a session identifier, an ordinal (e.g., relating to an order within a transaction), the duration of time spent processing the request and/or generating the response, state information, a local Internet Protocol (IP) address, a local port, a remote IP address, a remote port, and the like.

As the above examples indicate, characteristic information can include information generated by the agent itself and information generated and/or processed by the component or sub-component monitored by the agent (e.g., 220, 225, 230). The agent can then cause information identifying those characteristics to be provided to an agent manager within or coupled to elements of a virtualization system. In some embodiments, each agent collects information to form a message, also referred to herein as a frame, which describes characteristics associated with both a detected request and a detected response corresponding to that request. In such embodiments, the agent can wait for the response corresponding to the request to be generated and sent before sending the frame to the agent manager (e.g., 246, 264).

Instrumentation agents can monitor and report characteristics independently for each transaction in which the component (e.g., components of applications 235, 240 interacting with database 120 through database APIs 284, 290) being monitored participates. In addition to monitoring the performance of a single component and aggregating information about that component over a multitude of transactions (such that information about the performance of individual transactions can, for example, averaged, based upon the observed performance of the component over the course of performing the multitude of transactions), agents can additionally provide characteristics that are specific to and correlated with a specific transaction. More particularly, these characteristics that are monitored and reported by agents can be specific to and correlated with a particular request and/or response generated as part of a transaction.

In some embodiments, the agents can communicate with agent managers via messaging systems such as Java™ Message Service (JMS). Agents can alternatively communicate with agent managers using techniques other than those involving messaging systems. For example, agents can write information to a data structure of the agent manager, for instance, using database commands, and the agent manager can monitor those database commands to detect new information.

Some instrumentation agents (e.g., 220, 225, 230) can be implemented by inserting a few lines of code into the software component, virtual machine, or the application server associated with that software component being instrumented. Such code can be inserted into a servlet filter, SOAP filter, a web service handler, an EJB3 method call, a call to a Java Database Connectivity (JDBC) handler, and the like. For example, an instrumentation agent configured to monitor an EJB can be configured as an EJB3 entity listener (e.g., to monitor entity beans) or interceptor (e.g., to monitor session beans). For example, in some implementations, agents can include functionality similar to functionality described, for instance, in U.S. patent application Ser. No. 11/328,510, titled "Instrumentation System and Method for Testing Software," filed Jan. 9, 2006, which is hereby incorporated by reference in its entirety as if completely and fully set forth herein.

In some embodiments, all or some of instrumentation agents are configured to perform interception and/or inspection (e.g., using the Java™ Virtual Machine Tool Interface, or JVM TI). Such an instrumentation agent can register with the appropriate application programming agent (API) associated with the component or process being monitored in order to be notified when entry and/or exit points occur. This allows the agent to detect requests and responses, as well as the characteristics of those responses. In particular, this functionality can allow an instrumentation agent to detect when a component begins reading and/or writing from and/or to a socket, to track how much data is accessed (e.g., read or written), obtain a copy of the data so read or written, and generate timing information (as well as information describing any other desired characteristics) describing the time at which the data was read or written.

Some agents (e.g., 220, 225, 230) are configured to monitor individual threads by monitoring the storage used by each thread (i.e., the thread local storage for that thread). Such agents can detect when the monitored thread begins reading or writing to a thread local variable in the thread local storage. In response to detecting this access to the thread local variable, the instrumentation agent tracks the amount (e.g., in bytes, as tracked by incrementing a counter) of data that has been accessed, as well as the starting offset within the thread local storage to which the access takes place. In response to detecting that the thread's access to the thread local variable has ended, the instrumentation agent can use the information about the access to identify characteristics such as the time of the access, the variable being accessed, the value being accessed, and the like.

As noted above, one of the characteristics that can be collected by agents (e.g., 220, 225, 230) is timing information, such as a timestamp, that indicates when a particular request was received or when a particular response was generated. As described in more detail below, such timing information can be used, for instance, by service model generator 248 to identify that frames received from different agents (e.g., 220, 225, 230) are related to the same transaction. In order to enable service model generator 248 to rely on such information, the agents can be configured to synchronize the timers used by those agents to generate the timing information with similar times used by other agents in the same system. In some instances, any one of a variety of conventional clock synchronization techniques can be used.

The information returned to model generator 205 by instrumentation agents (e.g., 220, 225, 230) can be temporarily stored (e.g., as agent data 252). Service model generator 248 can organize this information, for instance, to group information relating to common transaction fragments, transactions, and sessions (involving multiple transactions) and generate service models 250 from the agent data 252. A model generator can also generate service models from network traffic monitored by one or more connection monitors (e.g., 215) including one or more processors 266, memory elements 268, and other components, such as monitoring logic that can capture transaction requests and responses and associated characteristics as observed on the monitored network connection. Such information can be stored as monitor data 254 and used in addition to or in lieu of agent data in the generation or supplementing of service models 250, among other examples.

As noted above, logic of service model generator 248 can organize information in agent data 252 (and/or monitor data 254) so that information that describes characteristics of a portion of a particular transaction, or session, is grouped with other information describing the same transaction. Thus individual frames, each of which can be received from a different instrumentation agent, can be organized into groups of frames that describe a complete transaction.

In some embodiments, in order to group frames, the frames can be sorted based upon timing information, or other common information (e.g., a common amount of data, port number, etc.) associated with and/or included within those frames. In some cases, agents can be provided with functionality for tagging data of a request or response monitored by the agent before it exits or enters the component it monitors, the tag identifying a particular session or transaction to which the request or response and corresponding characteristic information belongs. After being sorted, the frames can be arranged in ascending or descending order, for instance, using timing information, inserted tag data, or other information. For example, the frames can be sorted according to a timestamp indicating when each frame was generated, when one or more requests identified in each frame were generated or received, and/or when one or more responses identified in each frame were generated or received. In some embodiments, the frames can be sorted based upon multiple pieces of timing information.

Within a group of frames associated with the same transaction or session, service model generator 248 can order the frames, such that the flow of the transaction can be followed from the start of the transaction to the end of the transaction. Each frame can include a field that identifies that frame (e.g., a frame ID), as well as a field that identifies a parent frame (e.g., a parent frame ID). The value of each frame's parent frame ID can equal another frame's frame ID. These frame identifiers can be generated, in some cases, by the agents. In one embodiment, the frame identifiers can be generated from information identifying the IP address (or other addressing information), port number, session identifier, or other information used by the monitored component or sub-component, the amount of data sent or received by the monitored component during the monitored activity, and/or the instrumentation agent itself.

A virtual service generation engine 210 can use the identified set of expected requests and responses defined in service models 250 to provide one or more virtual services simulating operation of a modeled component, such as database 245. Service models can further support stateful virtualization and imitate a series of particular requests in a session, such as a session driven by a human user of the client application providing the simulated inputs to database 245, among other examples. In one example, virtual service generation engine 210 can include one or more processors 256 and one more memory elements 244 along with other hardware- and software-based components, such as service instantiator 262, virtualization engine 260, and agent manager 264, among potentially other examples. Service instantiator 262 can be provided to instantiate virtual services from service models 250. For example, it can be identified that a dependency of an application (e.g., 235, 240), such as a database, is unavailable. A virtual service model 250 corresponding to the dependency can be identified and virtual service simulating the dependency can be initiated. Virtualization engine 260 can provide the instantiated virtual service. For example, in some cases, virtualization engine can provision a virtual service, such as described in U.S. Pat. No. 8,112,262, in a virtual machine with which a software component can interact with directly in lieu of the modeled dependency. In other instances, virtualization engine 260 can utilize agents (e.g., 220, 225, 230) to provide the responses of a virtualized dependency. For example, virtualization engine 260 can utilize agent manager 264 to instruct a particular agent (e.g., 220, 225, 230) to intercept particular requests from a corresponding instrumented software component to the dependency and generate synthetic responses consistent with a transaction defined in a corresponding service model 250 that mimics the response that would be received from a live version of the dependency.

As noted, service models (e.g., 250) generated by a model generator 205 can be based on requests and responses between two or more software components or systems (such as an application (e.g., 235, 240) and database 245). A virtualization engine 260 can detect a request of component that is to be virtualized and identify each transaction, defined in a service model (e.g., 250) corresponding to the virtualized component, that corresponds to a request of that type and similar attributes. The service model can further describe characteristics of the transactions. Such information can include timing information identifying time thresholds or limits at which particular requests and/or responses are detected or sent (e.g., in order to identify the delay between when the request was detected and/or sent and when the associated response was detected and/or sent), and the like. Virtual services instantiated from such service models can embody these performance characteristics captured or defined in the service model, including response times, network bandwidth characteristics, processor usage, etc.

In one example, a virtualization engine 260 can be configured to identify and describe requests and responses in each of a variety of different protocols as well as the pertinent information from each. Thus, service models can include configuration information identifying the basic structure of requests and responses for each of several supported communication protocols. Depending upon the protocol in use, for instance, requests can take the form of method calls to an object, queue and topic-type messages (e.g., such as those used in Java messaging service (JMS)), requests to access one or more web pages or web services, database queries (e.g., to a structured query language (SQL) or Java database connectivity (JDBC) application programming interface (API)), packets or other communications being sent to a network socket, and the like. Similarly, responses can include values generated by invoking a method of an object, responsive messages, web pages, data, state values (e.g., true or false), and the like.

Service models 250 can be used as the basis of virtual services modeling the software components providing the requests and/or responses modeled in the service models 250. Virtual services can capture and simulate the behavior, data and performance characteristics of complete composite application environments, making them available for development and testing at the request of a user or system and throughout the software lifecycle, among other advantages. Virtual services can provide functionality beyond traditional piecemeal responders or stubs, through logic permitting the recognition of input/requests and generation of outputs/responses that are stateful, aware of time, date, and latency characteristics, support such transaction features as sessions, SSL, authentication, and support string-based and dynamic request/response pairs, among other features. Service virtualization and other virtual models can be leveraged, for instance, when live systems are not available due to project scheduling or access concerns. In cases where components have not been built yet, environments can employ virtual services to rapidly model and simulate at least some of the software components to be tested within an environment. Virtual services can be invoked and executed in a virtual environment implemented, for instance, within on-premise computing environments, agents, in private and public cloud-based lab, using virtual machines, traditional operating systems, and other environments, among other examples.

As noted above, in some implementations, when a service model is used to instantiate a virtual service, the virtualization process can involve comparing new requests generated by a requester (e.g., a client application under development) to the request information stored in a corresponding service model. For example, if a new request containing a particular command and attributes is received, the service model can be searched for a matching request that contains the same command and attribute. If a matching request is found, the virtualization process returns the response (as identified by information stored in service model) associated with the matching request to the requester.

In many situations, the requests provided to a virtual service will not be exactly the same (i.e., containing the same request as well as the same attribute(s)) as the requests identified in service model. For example, a request provided to the corresponding virtual service may contain the same request but a different attribute or set of attributes. A service model can further include information usable to handle these requests. For instance, transactions containing requests that specify the same command can be identified as being of the same transaction type. Alternatively, a set of transactions can be identified as being of the same type if all of those transactions have requests that include the same command as well as the same number and type of attributes. The particular technique used to identify whether two or more transactions are of the same type can be protocol specific, in some embodiments (e.g., classification of transactions can be at least partially dependent upon the particular communication protocol being used between the requester and the server).

For each unique type of transaction included in a service model, some implementations of a service model can further provide information or instructions for use by a virtual service in generating responses to requests with unknown attributes (e.g., an unknown attribute that was not observed as part of the monitored traffic or even specified by a user during a manual service model building process). Further, service models can also include information describing how to respond to an unknown request (e.g., a request that contains a command that was not observed as part of the monitored traffic). As an example, the request portion of this service model information can indicate (e.g., through the use of a wildcard command identifier) that all unknown types of requests that are not otherwise identified in service model should match this request. The response portion of the generated information can include an appropriate response, among other examples.

In addition to adding information describing unknown transactions of known and unknown types, some implementations of service models can support time sensitive responses. In such embodiments, response information in the server model can facilitate substitution of time sensitive attributes for actual observed attributes. For instance, an actual attribute "10:59 PM Oct. 1, 2009" can be replaced with a time sensitive value such as "[SYSTEM CLOCK+11 HOURS]". When the service model is used to generate responses by the virtual service, the time sensitive value can be used to calculate the appropriate attribute to include in each response (e.g., based on the current system clock value). To illustrate, in this particular example, if the service model is being used by a virtual service and the response attribute includes the time sensitive value [SYSTEM CLOCK+11 HOURS], the response generated based upon the service model will include the value generated by adding 11 hours to the system clock value at the time the request was received. In general, time sensitive values specify an observable time, such as a time value included in a request or the current system clock time, and a delta, such as an amount of time to add or subtract from the specified observable time. Time sensitive values can be included in the response information for all types (known and unknown) of transactions.

In some implementations, a service model can further include information facilitating the use of request sensitive values to be included in responses generated by the virtual service using the service model. A request sensitive value can link an attribute included in the request to a value to be included in the response. For example, response information in a service model can indicate that a particular request attribute be used as the basis of a particular attribute of the response to be returned in response to the request.

When the model is used, the response generated by the virtualized service will include the value indicated by the request sensitive value. For example, the model can include three known transactions of a given transaction type, as well as one unknown transaction of that type. The information describing the unknown transaction can indicate that the single response attribute is a request sensitive attribute that should be the same as the first attribute of the request. A request of that type that contains an unknown first attribute (i.e., an attribute that does not match the attribute(s) stored for the three known transactions of that type in the model) can be sent to the virtualized service. In response to receiving this request and accessing the request sensitive value specified in the response information for the unknown transaction, the virtualized service returns a response that includes the value of the first attribute that was contained in the received response. As an example, if the information describing a known transaction of type A indicates that the request includes the string "UserID" as the first request attribute and that the corresponding response includes the string "UserID" as its second response attribute, a request sensitive value specifying "[REQUEST ATT 1]" (first request attribute) can be generated for the second response attribute in the service model, among many other potential examples, including more complex examples with more complex dependencies defined in the service model between certain request attribute and request sensitive response attributes.

A service model can include still additional information. For example, a service model can identify characteristics of each transaction in order to identify availability windows for a corresponding software component modeled by the service model, load patterns for the software component, and the like. For example, if an access window is identified for a particular type of transaction, a corresponding service model can be generated to include a characteristic indicating that a response (or a particular type of response) will only be generated if the request is received during the identified access window, among many other potential examples.

Turning to FIG. 3, a simplified block diagram is shown representing an example view of an example service model 300. For instance, FIG. 3 shows information that can be maintained as part of a service model. In this particular example, service model 300 can include a row for each of several transactions. Each row of service model 300 can identify a command, zero or more attributes, zero or more characteristics, and one or more response attributes. This service model can be stored in a spreadsheet, table, database, or any other data structure.

In this example, transaction 301(A) is a transaction corresponding to a scenario defined in an interaction contract defined between two or more developers. In other instances, transaction 301(A) can be a transaction that was an observed transaction that actually occurred between a requester and a server component being modeled, as detected, for instance, by an agent or other tool. The information describing transaction 301(A) can include request information, which includes command 311 and zero or more defined attributes 321(1). The information describing transaction 301(A) can also include response information 341(1) describing the expected response that corresponds to the request. This response information 341(1) can also include one or more attributes. Characteristics 331(1) can include zero of more characteristics of transaction 301(A) defined based on scenarios of the interaction contract. These characteristics can include timing information describing a threshold delay of a response to a request or the like, as described above.

Transaction 301(B) can be of the same transaction type as transaction 301(A), since both transactions included a request that contained command 311. Transaction 301(B) is described by attributes 321(2) (which can have values that differ from those attributes defined in the request of transaction 301(A)), characteristics 331(2) (which can again differ from those for transaction 301(A)), and response 341(2) (which can also have a value that differs from the response defined for transaction 301(A)).

In this example, information describing n (an integer number) known transactions of the same type as transactions 301(A) and 301(B) is stored in service model 300. These known transactions are transactions that were either generated from scenario data or manually specified by a user. As part of the model building process, information describing an n+1th transaction of the same type has been added to service model 300 by the service model generator. This n+1th transaction, labeled transaction 301(n+1), can describe an "unknown" transaction of a known type of transaction. Such an unknown transactions is of a known type because it has the same command, command 311, as the other transactions of this type. However, unlike the other known transactions of this type, unknown transaction 301(n+1) can be used to respond to requests containing command 311 and "unknown" attributes that do not match those known attributes stored for transactions 301(A)-201(n) (not shown). The information describing transaction 301(n+1) thus includes information (e.g., wildcard information) identifying unknown attributes 321(n+1), such that any request that includes command 311 and an attribute that does not match the defined attributes stored for the actual transactions (e.g., such as transactions 301(A) and 301(B)) will match the request information for transaction 301(n+1). The information describing transaction 321(n+1) can also include default characteristics 331(n+1) and default response 341(n+1). These default values can be copied from the corresponding fields of an actual response of the same type.

Information describing another set of transactions of a different type can also be stored within the service model 300 for a particular software component. As shown, m+1 transactions, including transaction 302(A), 302(B), and 302(m+1) of a type of transaction in which the request includes command 312 can be stored in service model 300. Like transactions 301(A) and 301(B), transaction 302(A) can be another transaction corresponding to a scenario and involving the particular software component. Further, the information describing this transaction can also include the corresponding command 312, attributes 322(1) (if any), defined characteristics 332(1) (if any), and corresponding response 342(1).

In some instances, a model generator can automatically generate a set of requests and responses, together with corresponding attributes and characteristics of the requests and responses based on computer-parsable scenario data provided to the model generator. In some implementations, a user can supplement the transaction defined by the model generator with one or more user-specified transactions, for instance, in the event of a change or exception to the interaction contract or to capture a nuance not adequately detected and captured by the model generator, among other examples. For instance, a user can enter the information describing such a transaction via a user interface. The information describing transaction 302(B) can include command 312, zero or more user-specified attributes 322(2), zero or more user-specified characteristics 332(2), and a user-specified response 342(2). In some embodiments, the user is prompted for entirely new information for each of these user-specified fields. In other embodiments, the user can be allowed to select an existing field (e.g., of another user-specified transaction or of an automatically-detected transaction) to copy into one or more of these fields. It is noted that a user can also create a user-specified transaction by modifying information describing an actual transaction. As FIG. 3 shows, user-supplied transaction information can be stored in the same model as transaction information generated from parsing of scenario data of an interaction contract. In other instances, service models can be generated that are dedicated to user-supplied transaction information while others are dedicated to transaction information generated from scenario data by a model generator, among other examples.

In some instances, a service model 300 can also include information describing an unknown transaction 302($m$+1). The information describing transaction 302($m$+1) was added to service model 300 after m (an integer number, which does not necessarily have the same value as n) known transactions were described by the model. The information describing this unknown transaction 302($m$+1) can be used to handle requests of the same type (e.g., containing command 312) that specify unknown attributes. Accordingly, the information describing transaction 302($m$+1) can include command 312, unknown attributes 322($m$+1) (i.e., attribute information that will match any attributes not identified in the known attributes stored for the other m transactions of this type), default characteristics 332($m$+1), and default response 342($m$+1). Further, transactions of an unknown transaction of unknown type (e.g., 303) can also be defined in a service model 300. For instance, the information describing transaction 303 can be used to respond to any request of a type not already described by another row of service model 300. Accordingly, a request containing a command other than commands 311 and 312 could be responded to using the information describing transaction 303, among other examples. As shown, the information describing transaction 303 includes unknown command information 313, which is configured to match any command not already specified in service model 300, unknown attribute information 323, which is configured to match all attributes (if any) associated with unknown commands, default characteristics 333, and a default response 343. As with the default characteristics and responses associated with unknown transactions of known type, transaction 303's default characteristics and response can be user-specified.

Figure 4:
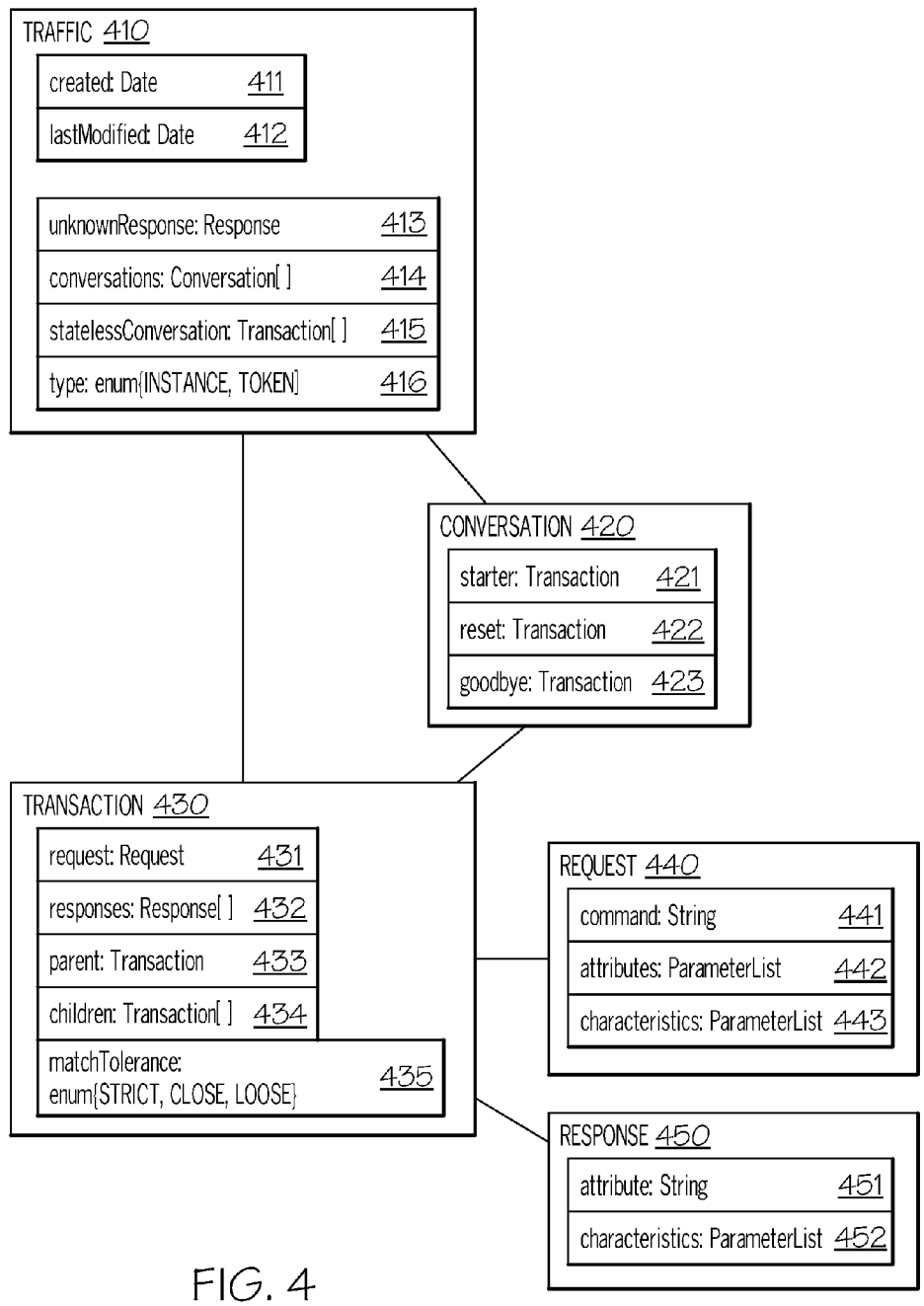
FIG. 4 is a simplified block diagram illustrating aspect of another example service model in accordance with at least one embodiment.

Turning to FIG. 4, a simplified block diagram is shown illustrating representing example features of an example service model for use in virtual services supporting stateful and stateless transactions. Statefulness of a transaction can be identified from parsing of scenario data to generate a service model supporting the modeling of such stateful transactions. In the example of FIG. 4, a data model is shown that includes five data patterns: traffic pattern 410, conversation pattern 420, transaction pattern 430, request pattern 440, and response pattern 450. Traffic pattern 410 can be used to store information identifying a particular software application to be developed in accordance with an interaction contract and the transactions of such an application. Each service model can include a single instance of traffic pattern 410. As shown, traffic pattern 410 includes created field 411, which stores date information identifying when the service model of that particular application was initially created. Traffic pattern 410 also includes lastModified field 412, which stores date information identifying the most recent time at which any of the information in the service model of the particular service was modified.

Traffic pattern 410 can also include an unknownResponse field 413. UnknownResponse field 413 can store information identifying the particular instance of the response pattern that stores information identifying the response to use for unknown transactions of unknown types. Accordingly, in embodiments employing the data pattern of FIG. 4, if an unknown transaction of unknown type is detected by a request processing module, the request processing module will use the response pattern instance identified in unknownResponse field 413 to generate a response.

Traffic pattern 410 includes conversations field 414. Conversations field 414 can identify one or more instances of conversation pattern 420. Conversation pattern 420 stores information representing a set of two or more stateful transactions. Such a set of stateful transactions is referred to herein as a conversation. The instance(s) of conversation pattern 420 identified in conversations field 414 identify all of the conversations for the application to be modeled. If the particular service does not include any stateful transactions (e.g., if no stateful transactions are identified from scenarios defined for an interaction contract), conversations field 414 will not identify any instances of conversation pattern 420.

Traffic pattern 410 can additionally include statelessConversation field 415. This field can identify one or more instances of transaction pattern 430. Transaction pattern 430 stores information representing a transaction. Each instance of transaction pattern 430 identified in statelessConversation field 415 stores information identifying a stateless transaction. StatelessConversation field 415 can identify instances of transaction pattern 430 associated with both known and unknown transactions of known types. If the particular service being modeled does not include any stateless transactions, statelessConversation field 415 will not identify any instances of transaction pattern 430. Type field 416 can store one of two values: INSTANCE or TOKEN that identifies the type of stateful transactions, if any, provided by the service being modeled.

As noted above, conversation pattern 420 can store information identifying a set of stateful transactions. A given service model can include n instances of conversation pattern 420, where n is an integer that is greater than or equal to zero. Conversation pattern 420 can include a starter field 421. This field stores information identifying an instance of transaction pattern 430 associated with a starter transaction. The starter transaction is a transaction that acts as the first transaction in a stateful series of transactions (e.g., a login transaction). In at least some embodiments, all starter transactions can be unknown transactions of known type, as will be described in more detail below. The particular transaction type to use as a starter transaction can be specified by the model generator or a user during the service model configuration process.

Conversation pattern 420 also includes reset field 422. Reset field 422 stores information identifying one or more instances of transaction pattern 430, each of which is associated with a reset transaction (such a reset transaction can be a known or unknown transaction). The value of reset field 422 can be provided by a user (e.g., the user can be prompted to identify the reset transaction(s) for each conversation). A reset transaction is a transaction that, if detected, causes the flow of the conversation to return to the point just after performance of the starter transaction. Conversation pattern 420 also includes a goodbye field 423. This field stores information identifying an instance of transaction pattern 430 associated with one or more goodbye transactions (of known or unknown type) for the conversation. A goodbye transaction is a transaction that causes the conversation to end. To reenter the conversation after a goodbye transaction is performed, the starter transaction for that conversation would need to be reperformed.

Transaction pattern 430 stores information identifying a transaction. Transaction pattern 430 includes request field 431, responses field 432, parent field 433, children field 434, and matchTolerance field 435. Transaction pattern 430 can be used to store stateful and stateless transactions (in some instances, the same transaction can occur both within a conversation and in a stateless situation where no conversation is currently ongoing). Transactions that are always stateless will not include values of parent field 433, children field 434, or matchTolerance field 435.

Request field 431 identifies the instance of request pattern 440 that stores information identifying the request (e.g., by command and attributes) portion of the transaction. Similarly, responses field 432 identifies one or more instances of response pattern 450 that store information identifying the response(s) that are part of that transaction. Each instance of response pattern 450 stores one response attribute (e.g., like those shown in FIG. 2), and thus if responses field 432 identifies multiple response patterns, it indicates that each of the identified response patterns should be used to generate a response when the corresponding request is received.

Parent field 433 stores a value identifying the instance of transaction pattern 430 associated with the transaction that occurs immediately before the current transaction in a conversation. Thus, if transaction pattern 430 stores information identifying the second transaction in a conversation (where the starter transaction is the first transaction in the conversation), parent field 433 can identify the instance of transaction pattern 430 associated with the starter transaction. Similarly, children field 434 can store information identifying each instance of transaction pattern 430 associated with a child transaction of the current transaction. Thus, if transaction pattern 430 stores information identifying the second transaction in a conversation, children field 434 can store information identifying the instance of transaction pattern 430 that stores the third transaction in the conversation. It is noted that children field 434 can identify more than one transaction.

MatchTolerance field 435 can store one of three values: STRICT, CLOSE, or LOOSE. The stored value indicates the match tolerance for a request received immediately subsequent to the current transaction. Strict tolerance indicates, for instance, that, if a conversation is ongoing, the request received immediately after the current transaction is only allowed to match transactions identified in the current transaction's children field 434. If instead close tolerance is specified, the request received immediately after the current transaction can match any of the current transaction's children, as well as any of the current transaction's sibling transactions. Further, if loose tolerance is specified, even more transactions are candidates for matching the next received request, and so on.

Request pattern 440 can include a command field 441, attributes field 442, and characteristics field 443. Each instance of request pattern 440 stores information identifying a particular request. A service model generator can allocate an instance of request pattern 440 for each transaction of known or unknown type. Command field 441 can store a string that identifies the command contained in the request. Attributes field 442 can store a parameter list that includes zero or more parameters, each of which represents an attribute of the request. Characteristics field 443 can store a parameter list identifying zero or more characteristics associated with the request. Each parameter in the list can identify a different characteristic. Examples of characteristics can include the time at which the request was sent, the system clock time at which the request was received by the service being modeled, network and/or system conditions that were present when the request was received, and the like. The parameters stored in characteristics field 443 can be used to generate time sensitive values, as well as to model actual conditions such as response timing and availability window, among other examples.

Response pattern 450 can include an attribute field 451 and a characteristics field 452. Attribute field 451 stores a string that represents a response attribute. As noted above, a given transaction can have multiple response attributes (e.g., responses field 432 of transaction pattern 430 can identify multiple instances of response pattern 450), and thus generating a response can involve accessing multiple response patterns in order to include the string identified in each of the response patterns' attribute field 451 in the response. Attribute field 451 can store one or more response attributes, as well as values, like request sensitive values and time sensitive values, generated by the service model generator. Characteristics field 452 can store a parameter list containing zero or more parameters. Each parameter can identify a characteristic of the response, such as the system clock time when the response was sent to the requester by the service, network and/or system conditions that were present when the response is to be sent, and the like.

Returning briefly to the discussion of FIG. 2, application servers 110, 115 can be provided that each host one or more applications (e.g., 235, 240). An application server (e.g., 110, 115) can include one or more processors (e.g., 280, 282) and one more memory elements (e.g., 286, 288). In some instances, software components of applications (e.g., 235, 240) hosted by application servers 110, 115 can access one or more databases (e.g., 245) using one or more database APIs or drivers (e.g., 284, 290). Databases (e.g., 245) can be hosted by external database systems with which applications interact over one or more networks (e.g., 130). Each database can host data comprising a plurality of records (e.g., 278). Database systems (e.g., 130) can include one or more processors (e.g., 272) and one more memory elements (e.g., 274) along with a database management system (DBMS) (e.g., 276), such as a DBMS configured to interface with and manage connections with potentially multiple applications including applications using one or more database APIs (e.g., 284, 290) to access the database (e.g., 245), among other examples.

Turning to FIG. 5A, a simplified block diagram 500a illustrates recording of one or more transactions involving an application 240 and database 245. In this particular example, an application 240 can request a connection 505a with database 245. In some instances, requesting the connection 505a can include obtaining a handle to a data source and/or transactional connection. Agent 225 can intercept the connection request 505a before it is passed to a database API 290. The agent 225 can generate frame data describing the request including the context of the request. Such context information can be obtained internally from the application 240. The agent 225 can permit the connection request 505a to progress to the database API 290. The database API 290 can translate the connection request into those methods and messages that are to then be exchanged with the database 245 (or, more precisely, the DBMS of database 245) to negotiate and obtain a database connection 510. The database API 290 can return data, such as a connection object 515a, to one or more components of the application 240, the connection object 515a corresponding to the particular database connection 510. The agent 515a can further intercept the connection object 515a and add additional frame data describing its characteristics as well as associate the connection object 515a to the connection request 505a.

Connection data, such as connection object 515a can be utilized throughout the application's 240 particular connection with the database 245, including queries of the database 245 made by the application 240. In one example, the application 240 can use the connection to query 525a the database. The agent 225 can intercept the query command and generate frame data describing the query 525a as well as associate the query to the connection (e.g., frames corresponding to the connection request 505a and received connection object 510). The query method can be passed to the database API and the API, in some instances, can create a SQL or other statement or stored procedure as well as complete the statement by binding variables, setting optional attributes, etc. The statement can be executed (at 530) and the database 245 can return a result to the search. In some cases, scalar or pointer based results (e.g., resultsets, readers, cursors, etc.) can be returned in connection with the query 530. The application can then proceed through the pointer-based results (e.g., through multiple calls to the database API 290) to retrieve the actual results of the query (at 540). This sequence of retrieval requests and returned results (at 540) can also be captured by the agent 225 and corresponding frame data can be generated describing the interaction between the relevant components of the application 240 and the database API 290.

As introduced above, the agent 225 can pass frame data to the service model generator 248 collected during monitoring of transactions between the application 240 and database 245. Additionally, the agent 225 can receive instructions from the service model generator 248 regarding what and how to record the transaction as well as data collected from other agents (e.g., monitoring other components of application 240 or other applications) that can provide context to agent 225 (e.g., session information) during its own monitoring of transactions. The service model generator 248 can group frame data describing the related transaction fragments (e.g., requests and their responses), transactions, and sessions and generate new, or supplement an existing, service model (e.g., 250a) describing the responses of the database 245 to various messages originating from the application 240.

Figure 5B:
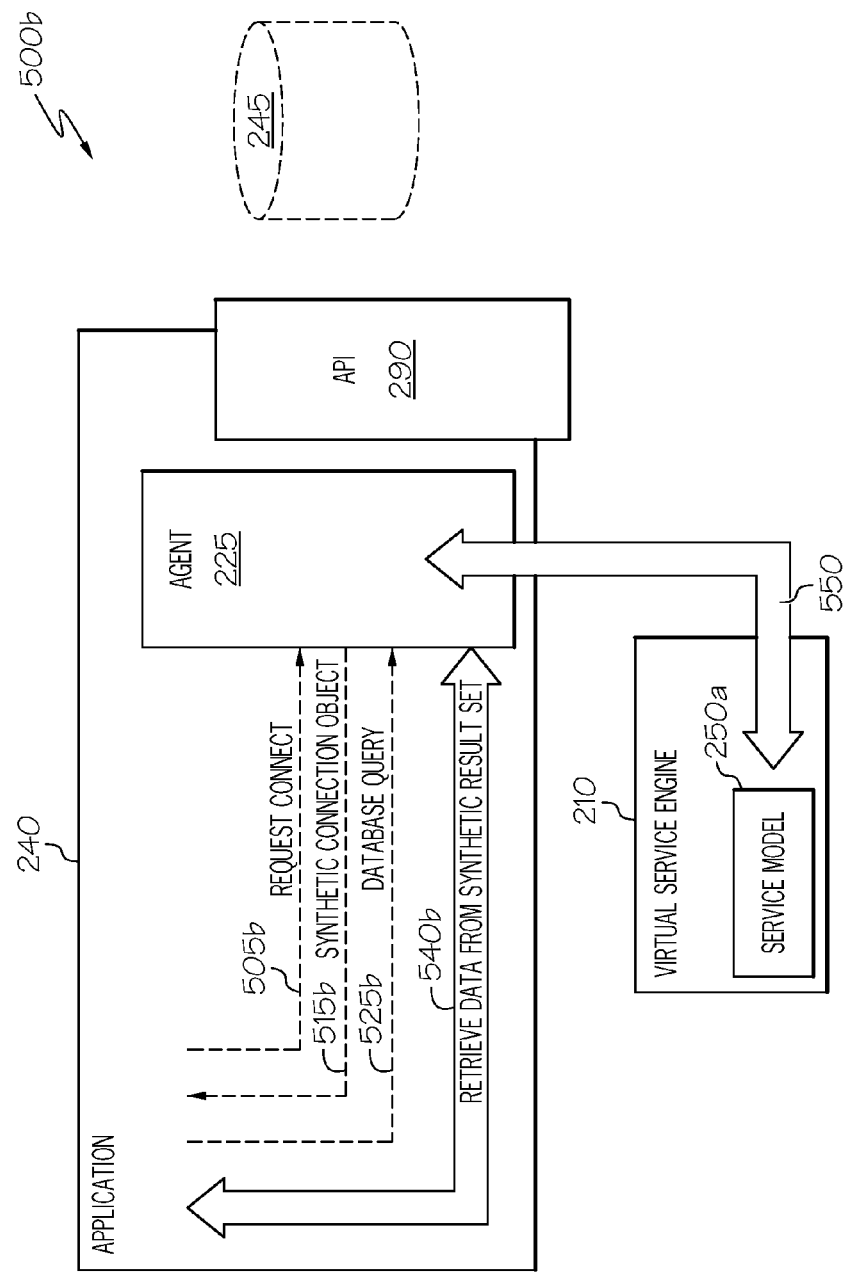

Turning now to FIG. 5B, another simplified block diagram 500b is illustrated showing an example playback of the service model 250a that serves to virtualize database 245 (e.g., when database 245 is unavailable). In one example, in connection with the instantiation of a virtual service standing-in for the database 245, virtual service engine 210 can communicate 550 with the agent 225 to obtain information from the agent 225 regarding transactions between the application 240 and database 245 and utilize the agent 225 to virtualize the database 245.

In the particular example of FIG. 5B, a software component of application 240 can request a connection 505b with database 245 and attempt to call database API 290 to obtain the connection. When a virtual service has been instantiated from service model 250a, agent 225 can be instructed by virtual service engine 210 to intercept such calls before they are allowed to be provided to the database API 290. The agent 225 can intercept the connection request 505b and generate data describing the structure and attributes of the connection request to the virtual service engine 210. The virtual service engine 210 can identify the service model 250a (e.g., that it applies to this transaction) and determine whether the service model 250a defines a model for responding to requests of the type and contents of the connection request 505b. In this example, the virtual service engine 210 identifies that a synthetic connection object of a particular format and possessing particular content is to be returned so as to satisfy the request based on the service model 250a. The synthetic connection object can be based on one or more actual responses (e.g., 515a) returned, and captured by an agent (e.g., 225), from the database API 290 when interacting with the live database 245, among other examples. The virtual service engine 210 can instruct the agent 225 to return the synthetic connection object 515b to the application. Attributes of the synthetic connection object 515b to be returned in response to the particular connection request 505b can be tailored to include content and information that corresponds to or otherwise is expected based on content or other attributes of the connection request 505b.

Continuing with the example of FIG. 5B, a database query 525b can be sent by the application 240 intended for database 245. In other words, based on the connection object 515b returned in response to the connection request 505b, the application 240 may be unaware that it is interfacing with a virtualization of the database 245 rather than the database 245 itself. The agent 225 can intercept the query 525b and coordinate a response to the query 525b with the virtual service engine 210 based on the service model 250a. For instance, the agent 225 can build a frame describing the query 525b, including, for instance, SQL statements, variables, connection information, etc. The virtual service engine 210 can consult the service model 250a to identify how to respond, or adequately simulate a response, to a query with these features. In this example, the virtual service engine 210 can determine a set of synthetic query results from the service model and provide the query results to the agent 225. The synthetic query results can include a synthetic data set as well as scalars or pointers to the results, as expected by the application 240. The agent 225 can further be instructed by the virtual service engine on how to deliver the synthetic query results to the application (e.g., according to how the application 240 would consume the results were they provided from the database 245 through the database API 290). For instance, the application may retrieve the data from the synthetic result set (at 540b) by referencing an object (synthesized and returned by the agent) and referencing a pointer to individual rows or records contained within the object to have individual or particular rows or portions of the result set object returned (e.g., by the database API 290 during live operation and by the agent during virtualization). Accordingly, multiple requests may be received by the application as it moves through the result set to retrieve the results (at 540b). The agent 225 can simulate the responses the application would expect to receive were it actually interacting with the database API 290. In order to reduce round trips between the agent 225 and virtual service engine 210, in some implementations, the virtual service engine 210 may provide the agent 225 with all the information it needs to properly simulate interaction with the application 240 during the application's retrieval of the synthetic query results.

Figure 6A:
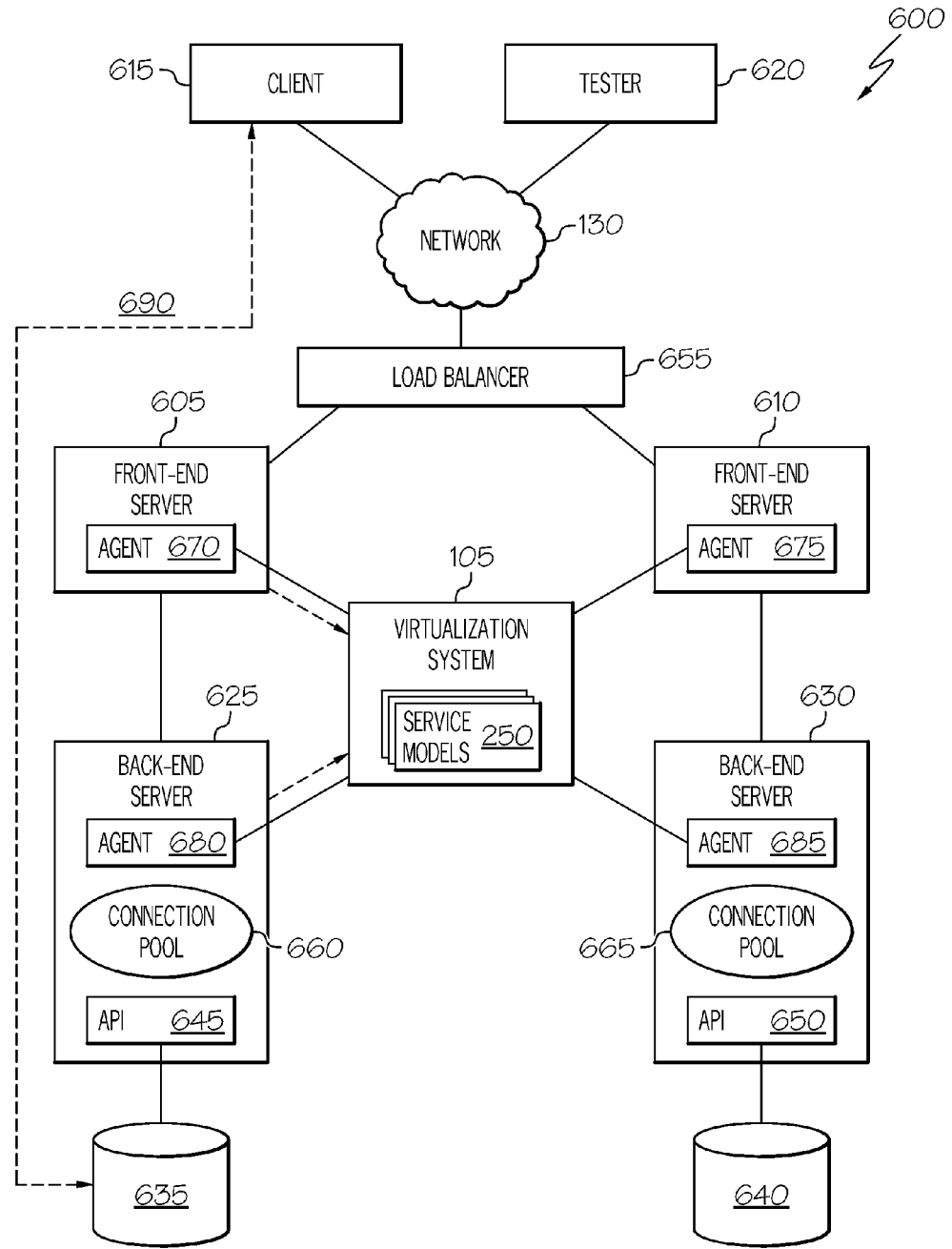
FIG. 6A-6B are simplified block diagrams illustrating interactions of a virtual service engine with agents to record transactions involving a database in accordance with at least one embodiment.
Figure 6B:
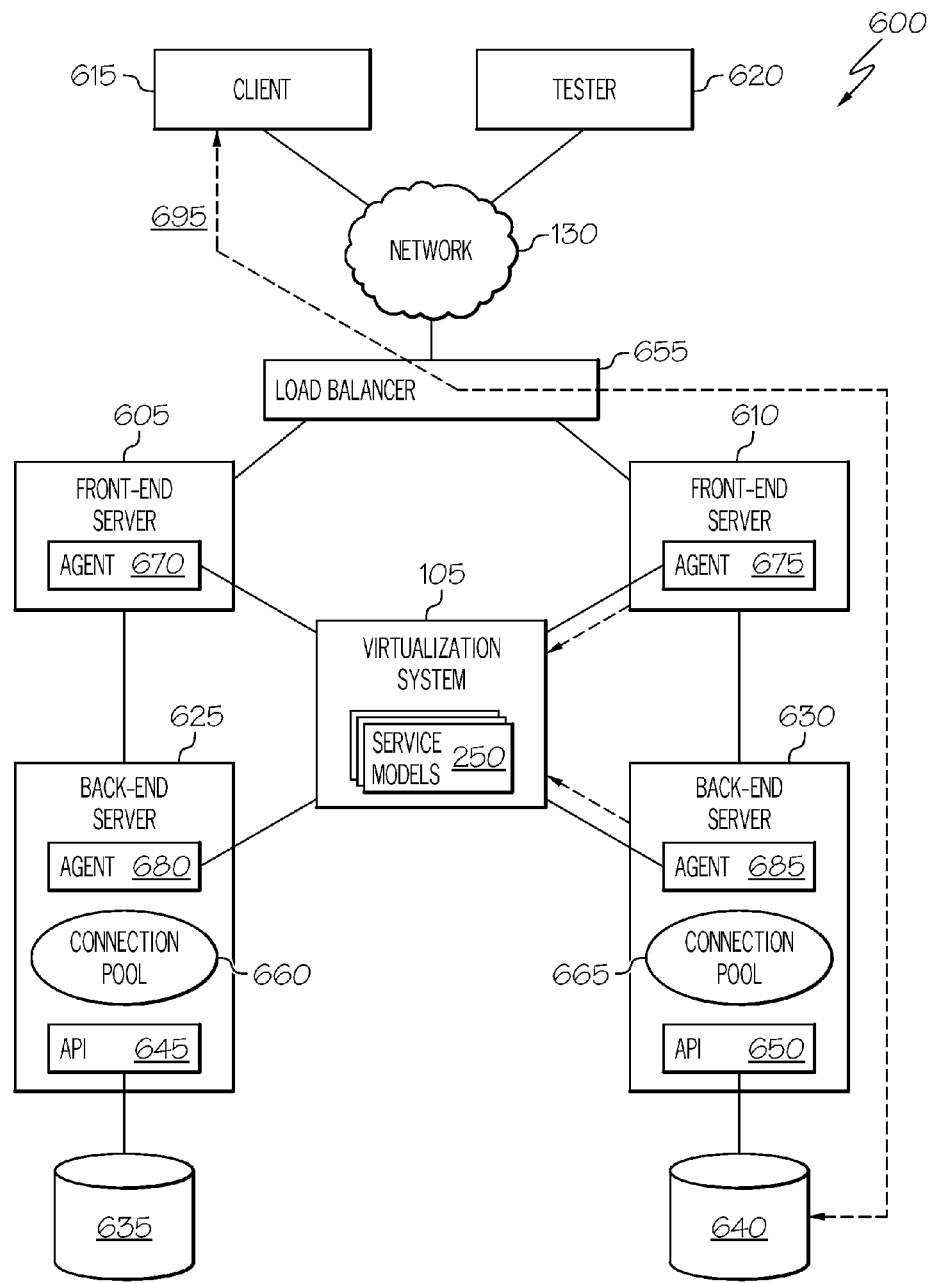

Using agents in the virtualization of a database can be flexibly employed in more complex transactions involving a database. FIGS. 6A-6B illustrate example transactions in a system 600. In these examples, a system 600 can be provided, such as a web service or website, that is provided using a front-end (e.g., 605, 610) that interfaces with consumer clients (e.g., 615, 620) and a back-end (e.g., 625, 630) that is to interface with instances (e.g., 635, 640) of a database using database APIs or drivers (e.g., 645, 650). The system can further include a load balancer 655 for distributing traffic to two or more servers. Additionally, connection pools 660, 665 can be utilized to reuse connections established, for instance, between back-end servers 625, 630 and a database, further complicating virtualization of the database, as directly associating specific connections with specific transactions becomes less feasible. A virtualization system 105 can be provided possessing the flexibility to interface with one or more agents (e.g., 670, 675, 680, 685) provisioned on each of front-end servers 605, 610 and back-end servers 625, 630 to record transactions and generate service models 250 that can be used, with agents 670, 675, 680, 685, to virtualize interactions with the database instances 635, 640 at a level just above the database API 645, 650.

In the example of FIG. 6A, a live session can be observed and tracked using agents 670, 680 instrumented on software components in each of front-end server 605 and back-end server 625. In this example, the session can include several (e.g., 10 or more) separate SQL queries resulting from a user's (e.g., at client 615) interactions with a front-end webpage. For instance, a user may access an e-commerce application and log-in to an account, search past orders, search products, purchase a product, confirm shipping status, etc. all within a single session, each of the interactions potentially resulting in one or more queries of a database. One such request, and resulting transactions 690, illustrated in FIG. 6A, may be routed by load balancer 655 to front-end server 605. Agent 670 can record the data received and sent between front-end server 605, as well as data internal to front-end server 605, including session data maintained by the front-end server that identifies the particular session between the user at client 615 and the web service. For instance, in one example, load balancers (e.g., 655) can maintain session identity via sticky session cookies and the HTTP layer of the agent 670 can extract those session cookies (e.g., via standard APIs). The agent 670 can generate frame data describing the request (and including the session data), as well as append a session identifier tag to data that is ultimately sent from front-end server 605 to back-end server 625 in furtherance of the transactions 690 in the session. Tagging a request sent from front-end server 605 to back-end server 625 can allow the agent 680 monitoring back-end server 625 to maintain state of the transaction and correctly associate frame data describing the session of client 615 with the transaction fragment between front-end server 605 and back-end server 625 as well as the transaction fragment(s) between back-end server 625 and database instance 635 resulting from the original client requests.

Continuing with the example of FIG. 6A, backend server 625 can open a new or utilize an existing connection (e.g., from connection pool 660) with database 635 and query the database using database API 645. As described, for instance, in the examples of FIG. 5A, agent 680 can record data sent to and emerging from database API in connection with the query of the database and generate frame data to be sent to virtualization system 105 describing the transaction with the database (including connecting with, querying, and retrieving query results from the database). This frame data, or other frame data, can also be generated to describe the request and resulting response to the request of the front-end server 605 in the session. Further, the front-end server can process the response received from the backend server 605 and generate a response to be sent to the client 615. Agent 670 can record these interactions between frontend server 605 and backend server 625 and client 615, identify, from session tags, that each of these transaction fragments pertain to the current session with client 615 and generate frame data reporting this activity to virtualization system 105. Such session tags can be used by agents 670, 680 and included in or otherwise used to report in frame data describing the various requests and responses in transactions 690, that these all are associated with the particular session with client 615. The virtualization system 105 can identify that these frames pertain to a common session and further identify which frames describe which transaction fragment (e.g., a first transaction between frontend server 605 and client 610, a second transaction between frontend server 605 and backend server 625, and a third transaction between backend server 625 and database instance 635, etc.). Accordingly, virtualization system can group frames by transaction and group transactions by session, allowing for generation of a service model describing sequences of transactions that may be performed in a given session (such as will be described in the examples of FIG. 8A-8B).

Turning to the example of FIG. 6B, upon receiving the results of transaction 690, a user may further interact with a web service (e.g., with an updated GUI based on the database query results of transactions 690) in the same session. Accordingly, an additional request may be generated by the client 615 in a new set of transactions 695 that is to result in a query of a database by a backend server supporting the web service. In the example of FIG. 6B, load balancer 655 routes the request, this time, to frontend server 610. Frontend server 610 identifies that this request is the same session as those of FIG. 6A and an agent 675 can report this to the virtualization system 105 and tag requests from frontend server 610 to backend server 630 with session tag data to allow agent 685 to further associate transactions 695 (and corresponding frame data) with the session with client 615 (including the earlier transactions 690 in the example of FIG. 6A). Backend server 630 can utilize a connection of connection pool 665 and query database instance 640 and return the result to frontend server 610 for delivery to client 615. Each of the requests and responses in this set of transactions 695 can be captured by one or both of agents 675, 685 and reported to virtualization system 105. The virtualization system 105 can again group the frames by transaction and associate these transactions with the session.

Further transactions (not shown) can be completed in the session with client 615 and can be captured and reported by agents 670, 675, 680, 685 to virtualization system 105. A service model can be generated from the frame data received from the agents by the virtualization system describing the entire session of transactions. Additionally, future sessions with client 615 (or other clients (e.g., 620)) can be recorded and frame data describing these sessions can be used to supplement the service model describing how conversations in sessions of system 600 proceed. This can allow for robust modeling of the variety of different session flows (conversations) that can take place in system 600, allowing virtual services instantiated from the service model to be able to effectively simulate responses of the database (or another virtualized software component (e.g., the backend server)) that might be received by live applications interfacing with the virtual service.

Figure 7A:
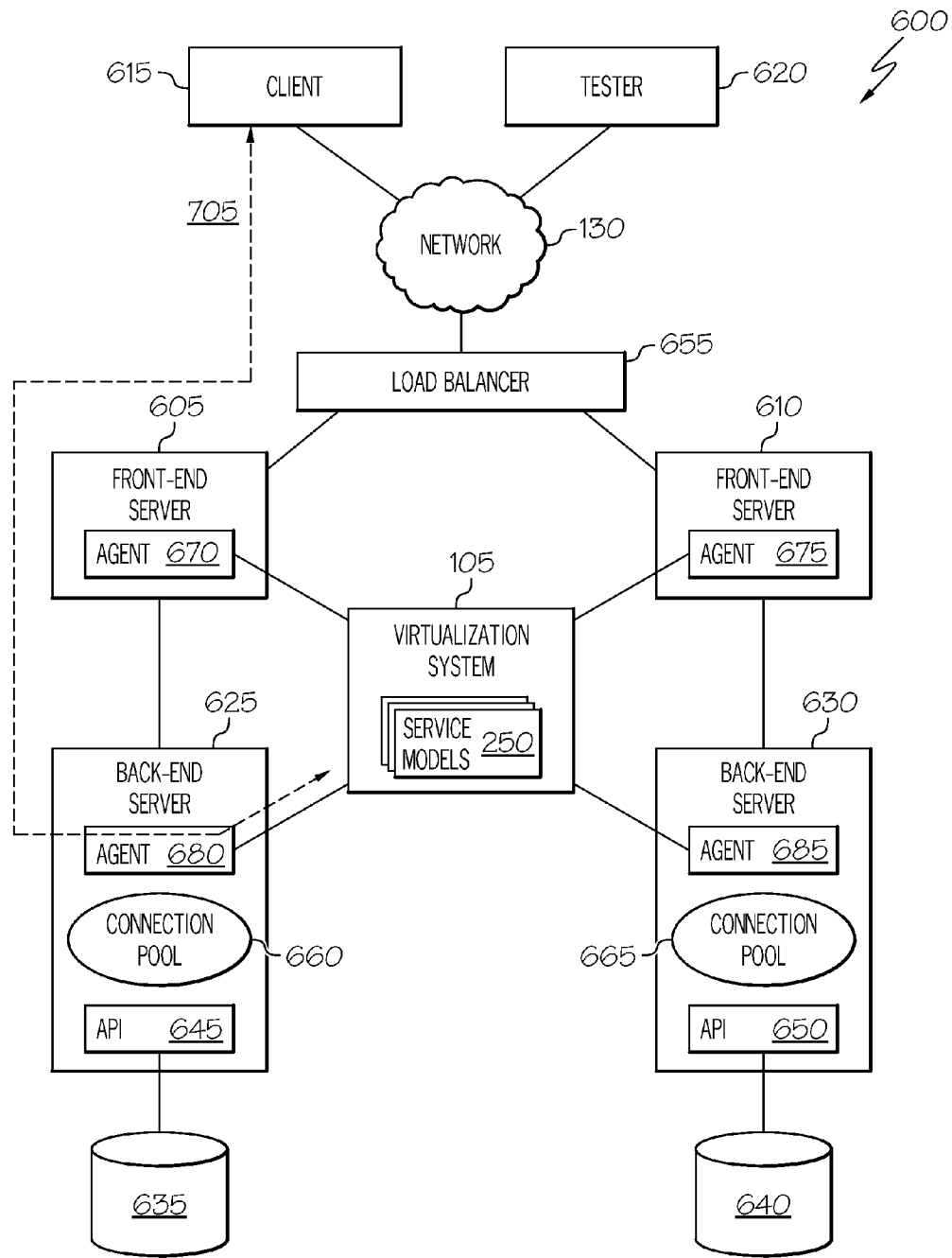
FIG. 7A-7B are simplified block diagrams illustrating interactions of a virtual service engine with agents to virtualize transactions involving a database in accordance with at least one embodiment.
Figure 7B:
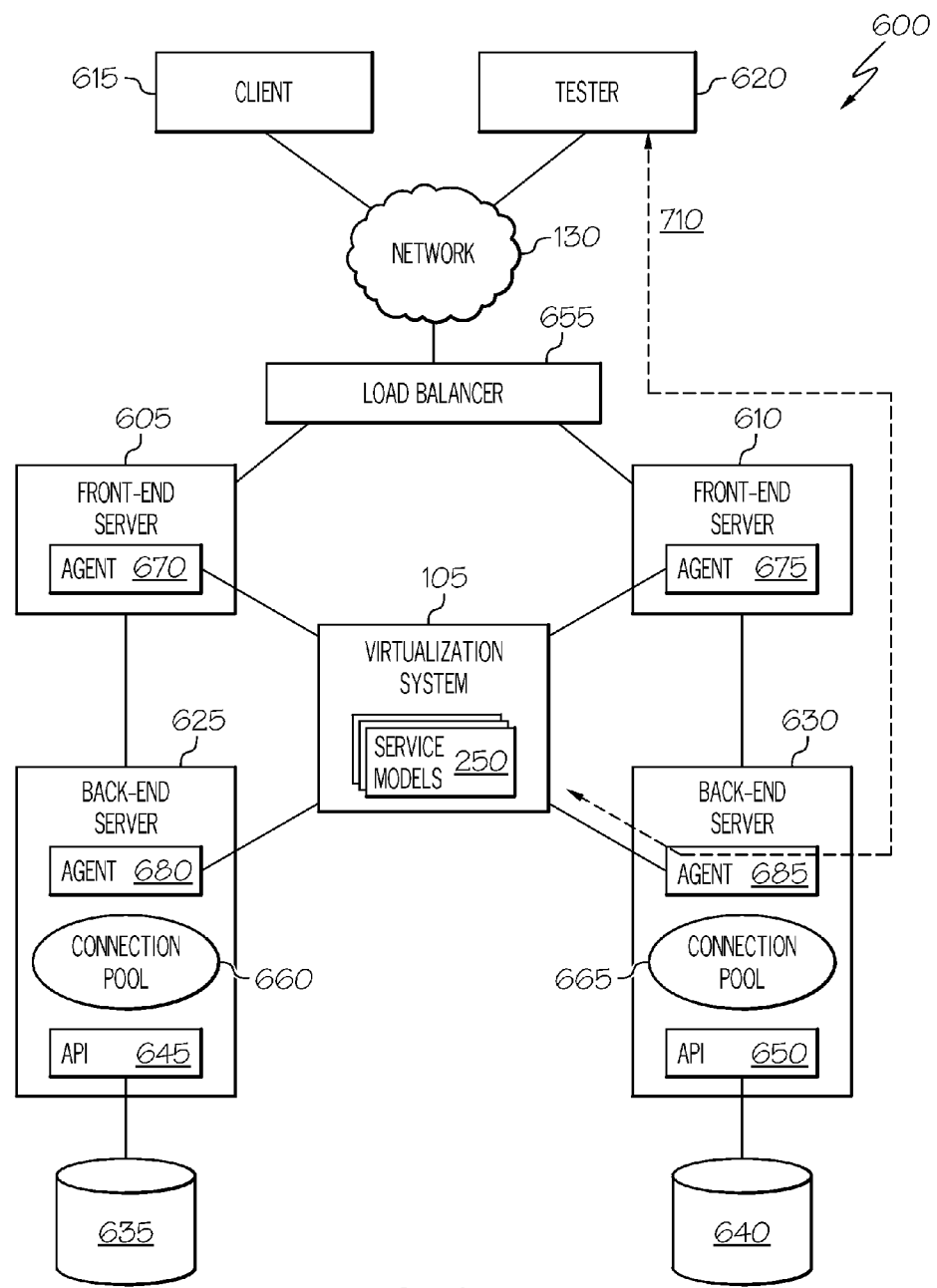

Turning to FIGS. 7A-7B, examples are shown of virtualizing database instances 635, 640 using agents (e.g., 670, 675, 680, 685) and a virtual service instantiated from a service model describing the responses of the database to various transactions, including within a session involving multiple transactions. For instance, in the example of FIG. 7A, a client 615 can interact with a frontend of a web service that causes the frontend server 605 to send a request to backend server 625. The backend server 625, upon receiving the request from the frontend server 605 may attempt to obtain a connection (e.g., a new connection or connection from connection pool 660) to the database (e.g., 635) to query the database and generate a response to the request of the frontend server 605. In this example, the backend server 625, and the completion of the transaction, is dependent upon the database, which may be unavailable. In this example, a virtualization system 105 can instruct agents (e.g., 670, 675, 680, 685) that database instances 635, 640 are to be virtualized in these transactions (e.g., 705). Accordingly, agents 670, 680 can monitor requests and responses involving software components they monitor and obtain data relevant to virtualization of the database. In the case of agent 680, the request to be sent through database API 645 can be "hijacked" such that the corresponding messages are not sent to the database API 645. The agent 680 can generate synthetic responses mimicking the data that would be expected from the database 635 (through the database API 645) in response to the request(s) based on virtualization of the database instance 635 as managed by virtualization system 105. In other cases, messages from the backend software components may be allowed to progress to the database API 645, however, the agent 680 can intercept errors or other response data sent by the database API and replace it with synthesized responses based on a corresponding service model (e.g., in service models 250), among other examples.

Agents monitoring other software components in a session can also collect data for use in virtualization of the database instance 635. For instance, although agent 670 monitoring frontend server component may not generate synthetic responses driven by the virtualization system during virtualization of the database instance 635, agent 670 may communicate with virtualization system 105 to provide other information for use in the virtualization, including the generating of synthetic responses at agent 680. For example, session data can be captured and passed to the virtualization system 105 by agent 670. This session data can be used to maintain state of the session and ensure that synthetic responses generated using agent 680 (as provided by virtualization system 105) are consistent with the session context of the transactions being virtualized, among other examples.

In some instances, virtual services can be used in connection with a test of a system (e.g., 600). For instance, a system under development may not have convenient access to database instances. This dependency can be overcome through the use of a virtual service virtualizing operation of the unavailable database. Further, inputs to the system can also be virtualized, for instance, using a tester (e.g., 620) that simulates a user or client system.

Virtualizing components, such as database instances 635, 640, can allow for testing or other uses of a virtual service without having to deviate from normal operation of the remaining (non-virtualized) components of the system. For instance, as shown in FIG. 7B (e.g., during a test of the system 600 using tester 620 and a virtualization of database instance 640), load balancer 655 and frontend server 610 can function normally without intervention of virtualization system 105. Further, complexity introduced to the test or scenario, for instance, through load balancer 655, connection pools 665, etc. can be addressed using agents (e.g., 685) capable of hijacking requests or undesirable responses caused by requests to software components (e.g., database API 650) affected by a dependency (e.g., database instance 640). Further, agents can also be selectively disengaged when their intervention is unnecessary. For instance, there may be calls to or uses of the database API that are to be allowed, either because they are not affected by the absence of the dependency (e.g., 640) or because a test or other operation is unconcerned with the dependency (e.g., when testing response of the system to the unavailability of the database instance 640), among other examples.

Another cause of indeterminism in session conversations can include out-of-order queries and unexpected queries of the database. Out-of-order queries can happen, for example, when a transaction runs database queries from multiple threads. However, queries from multiple threads can be interpreted based on whether they changed the underlying database state. For instance, when the agent records a database interaction it can determine whether the database state, or content, was indeed modified (e.g., SELECT statements are read-only, as well as INSERT, UPDATE and DELETE statements that return 0 records). For those interactions that do not change database state the corresponding frame can be generated by the agent to indicate that the interaction is "read-only". Based on this indication, the virtualization system can know how to move within the conversation pattern defined in the service model such that out-of-order database calls are still understood.

Unexpected queries can also happen due to caching effects, among other causes. For instance, after the results of a query have been cached for some period, the cache may be flushed and resulting in the query having to be re-executed. The timing of such cache flushes can be difficult to predict and some conversations may result in a refresh query occurring at an unexpected time in the conversation. However, service models can be based on many, repeated instances of similar transactions such that a determination can be made whether a particular type or form of query is a normal, dynamic, or non-essential transaction or transaction fragment. When such queries are intercepted and passed to the virtualization system by the agent, the virtualization system can analyze the intercepted query, identify whether it is normal, dynamic, or non-essential, and mark it as such. When dynamic or non-essential transactions are encountered and the agent requests a response for those, VSE can reply with a "generate synthetic result" directive.

As an example, in one illustrative instance, a single user transaction, such as a web service call, may result in the generation of a plurality of corresponding SQL statements. Frame data for these statements can be captured and defined in a single frame. Rather than generating a frame with a plurality of nodes corresponding to each of the plurality of SQL statements, the frame can be generated as a single node, whose request includes a combination of the web service request and the resulting, individual SQL frames requests. The response defined in the frame can include a combination of all of the resulting SQL frame responses. During playback, when the web service call is encountered, it may be allowed to proceed normally using application code, but with an additional call (by the agent) to the virtualization system. The virtualization system can return the plurality of SQL result responses to the agent based on the response defined in the frame. As each SQL statement is executed and intercepted by the agent, the agent can then identify the corresponding one of the synthesized SQL responses it has received from the virtualization system and virtualize the response by providing these synthesized SQL responses as it intercepts corresponding SQL statements, among other examples.

Figure 8A:
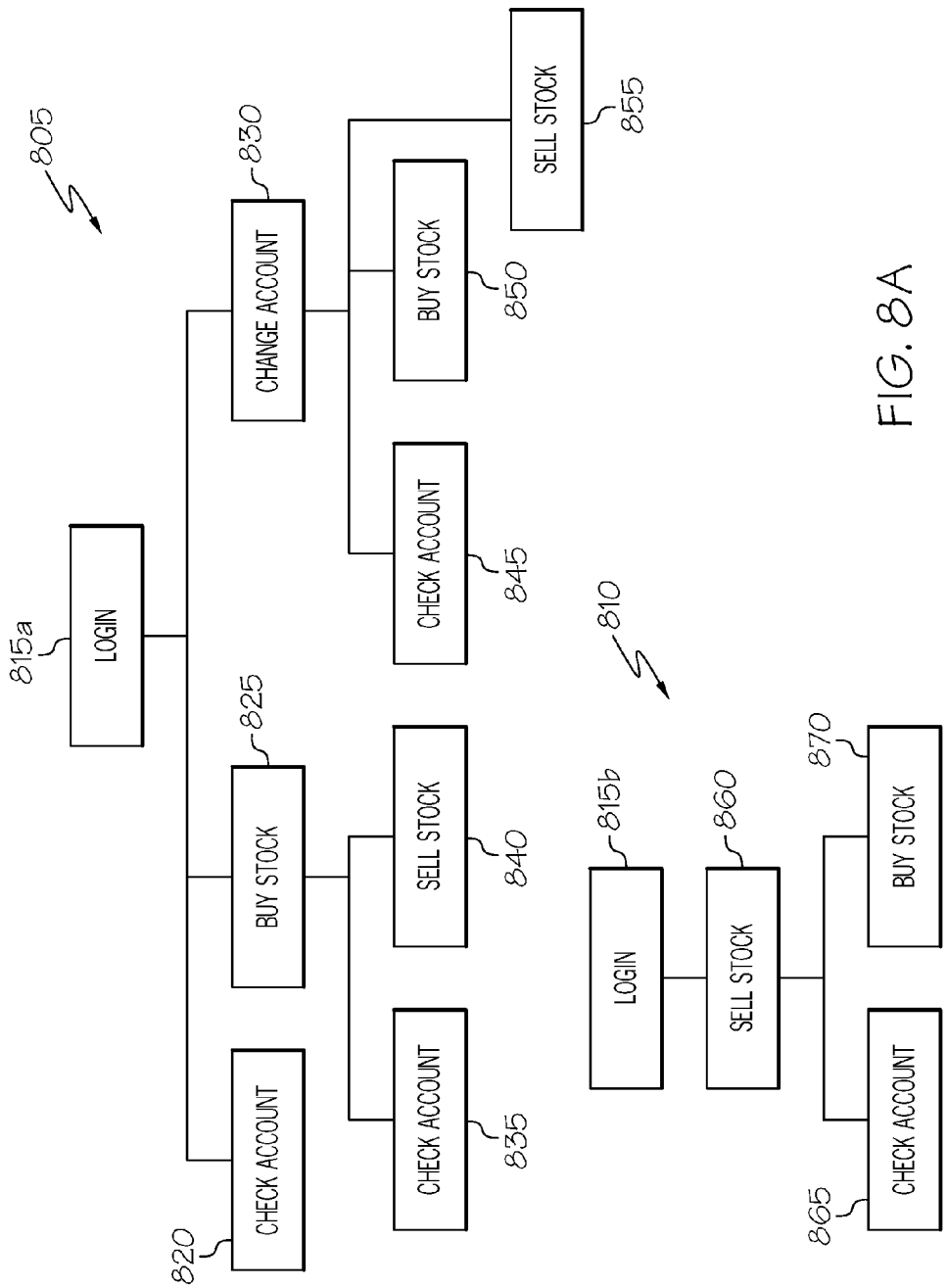
FIGS. 8A-8B are simplified block diagrams illustrating example transaction conversations modeled in one or more example service models in accordance with at least one embodiment.
Figure 8B:
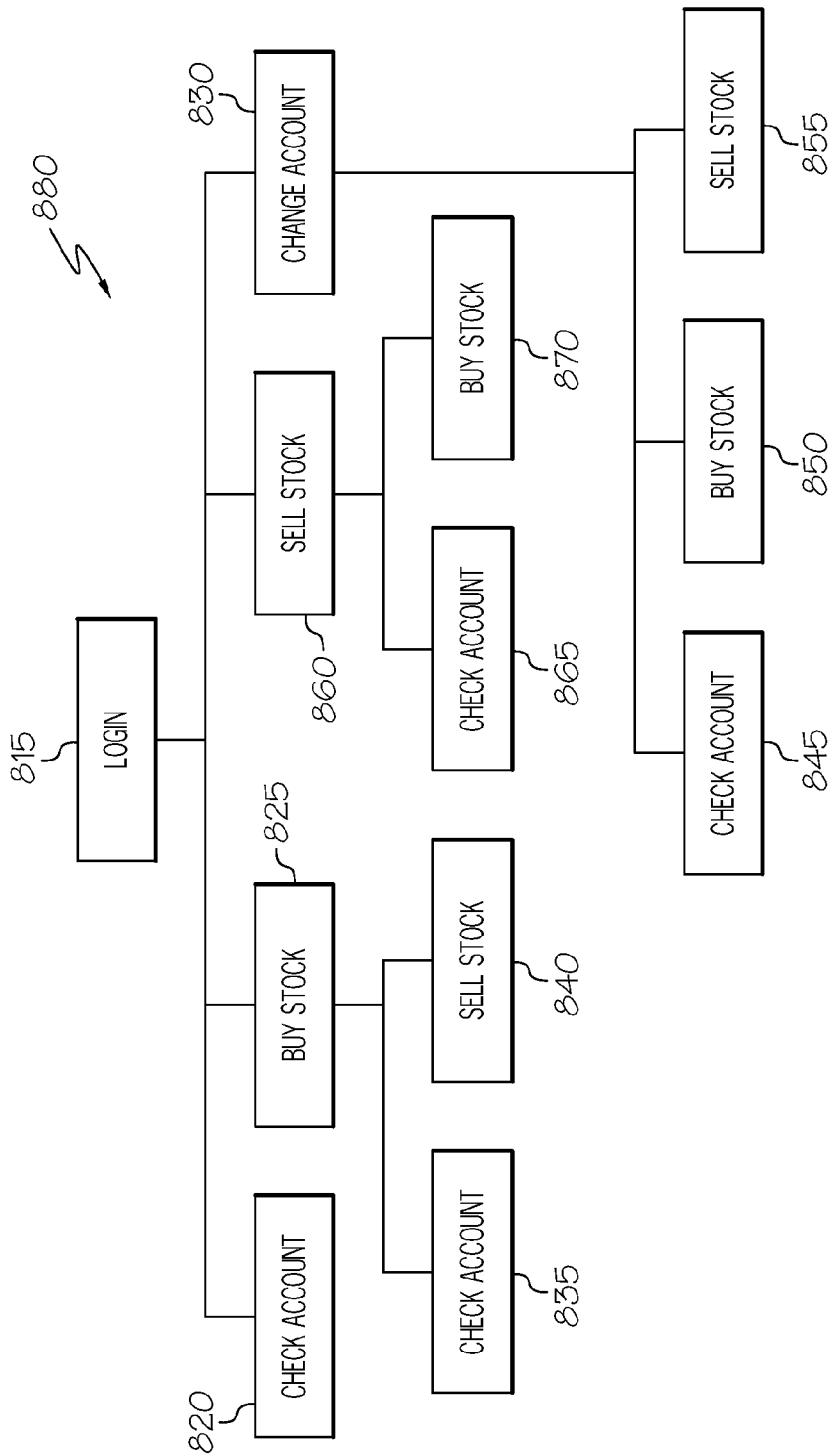

Turning now to FIGS. 8A-8B, simplified block diagrams are shown representing at least a portion of a service model corresponding to a conversation, or session, of transactions involving a database. Information included in the service model can be based on frame data developed by agents monitoring potentially multiple instances of the transactions involving the database. In the example of FIG. 8A, two separate trees 805, 810 are shown, representing potentially two different service models and two different conversations. However, each tree 805, 810 may pertain to transactions that involved a common application that accesses one or more databases using a particular database API. The resulting service model can permit virtualization of one or more of the databases accessed during the conversation.

For instance, in tree 805, a conversation or session flow can be defined, for instance, based on multiple recorded transactions involving an online stock trading tool that accesses one or more databases. For instance, a user may begin a session by logging-in to an account, and the login (e.g., 815) can include queries of a particular database that includes a table of authentication or other login data. A set of transactions may be identified, based on patterns detected in transactions recorded by the virtualization system including transactions that change database state. For instance, after logging-in, subsequent transactions may include checking account information (e.g., at 820) associated with the login, buying new stocks for the portfolio (e.g., at 825), and changing account information (e.g., at 830). Each of these transactions (e.g., 820, 825, 830) can include queries of database records. Some may only include read-only-type queries, such as checking account information 820. Others may include insert- or update-type queries (e.g., 825, 830). For instance, buying new stock 825 can include database read queries to return information about particular stock that is offered, but also include an update and/or insert following purchase of the new stock to update the stocks that are in the account's portfolio. These types of queries (also delete-type queries) change the database's state (e.g., content), and consequently also the state of the conversation. Accordingly, the conversation pattern followed by the virtualization system is to progress to the children nodes of the node where the state change took place (e.g., flowing to nodes 835, 840 following node 825).

During virtualization, a virtualization system can base the responses it generates to virtualize various components, including databases, based on the state of the conversation. Branches at the same level of the conversation pattern, or tree, are order independent, such that it does not matter how a conversation transitions from a parent node (e.g., Login 815a) to any of its children (e.g., 820, 825, 830). However, following a state change (e.g., at 825, 830) the conversation is constrained to progress to the children transactions of the transaction where the state change occurred. Failure to follow proper conversation flow can result in nonsensical synthetic responses by the virtualization system and even errors. In one example, a virtualization system can identify (based on frames from agents intercepting corresponding requests) that a Login-type transaction is taking place and consult the model defining how to respond to a Login-type request to generate a synthetic response of a database (and other software components). This can include identifying fixed structural attributes of the query that do not change between Login-type requests as well as variants in the statement that do change (e.g., the variables). For example, a Login query may always possess a common syntax and reference a particular table (e.g., USERS) of a common database. For instance, Login-type request may always include a SQL statement of the form "SELECT from USERS where user_id=*", with * representing the variant (e.g., the particular user ID). The service model may generate a response that corresponds to the form of response typically returned in response by the live database. This form can also be identified to include variant-dependent values. The virtualizations system can attempt to build a synthetic response that takes into account how the variant influences the database's own responses. Other service models of other transactions may define different (including more complex) structural and variant attributes, as well as rules for generating synthetic responses to these queries, among other examples.

Continuing with the example of FIG. 8A, after intercepting and generating a synthetic, virtualized response in the Login transaction 815a, the virtualization system can expect to detect any one of a check account information request 820, buy stock request 825, and change account request 830. In one example, following a Login transaction 815a, a request is identified as corresponding to a buy stock transaction 825 and the virtualization system transitions to node Buy stock 825 in the conversation pattern 805. If this request results in a new stock purchase and an update of a corresponding database table, the virtualization system can transition to the children of Buy stock node 825, and expect that a subsequent request in the same session is to be modeled by a Check account transaction model (at node 835) or Sell stock transaction model (at node 840). Likewise, had the conversation flow proceeded from the Login 815a to Change account 830, and an update, insert, or delete database transaction taken place, the virtualization system would transition to the children nodes (e.g., 845, 850, 855) of the Change account transaction model, and so on.

In the example of FIG. 8A, another service model can model a conversation 810 within the same example stock trading tool that also begins with a Login transaction 815b. The conversations recorded in connection with this modeled conversation 810 can include a Sell stock transaction 860 (e.g., potentially involving an read, update, delete, or other such database transaction), as well as children transactions Check account 865, and Buy stock 870 that succeeded the Sell stock transaction 815b.

In some implementations, a virtualization system can identify opportunities to combine, or stitch together multiple related conversations, based on the presence of a common transaction node. For instance, in the example of FIG. 8A, it can be identified that each of conversations 805 and 810 each include the Login transaction (e.g., 815*a*, 815*b*). Accordingly, it can be identified that transaction Sell stock 860 is a sibling of transactions Check account 820, Buy stock 825, and Change Account 830 (and their respective service models). For instance, as shown in the example of FIG. 8B, the conversation pattern models 805, 810 can be combined based on the relationship, into a united (and more complete) conversation model 880. As a result, the virtualization system can model a more complete set of potential conversations involving a session in the stock trading tool of the present example. Additionally, as further transactions are recorded and corresponding service models developed, the conversation of 880 can be further supplemented to potentially map every possible transaction and state change within a session involving the example stock trading tool, among other examples.

It should be appreciated that while the examples of FIGS. 8A and 8B discussed virtualization of data transactions in connection with an example online stock trading tool, that this example was presented for illustration purposes only. Indeed, it should be appreciated that a potentially limitless variety of applications and services that make use of various databases can make use of the features and functionality of a virtualization system such as that discussed above. Indeed, virtual service models can potentially be developed using virtualization system to virtualize any type of transaction with a database, such virtualization using, in some cases, agents provisioned on the applications, services, virtual machines, etc. that interface and consume data of the database.

Turning to FIGS. 9A-9B, simplified flowcharts 900*a-b* are presented illustrating example techniques involved in the generation of at least a portion of an example service model. For instance, in the example of FIG. 9A, an agent instrumented on a software component (e.g., in the code of the software component, in a virtual machine in which the software code is executed, or otherwise corresponding to and able to monitor the software component) can intercept various data being sent from and being received by the software component in connection with a transaction of a database. A database access component, such as a database API or driver, can be utilized by the software component to access the database. The agent can be instrumented so as to monitor data sent between the software component and the database access component. In the example of FIG. 9A, a request to open or otherwise obtain a database connection (e.g., from a connection pool) from the software component can be intercepted 905. A corresponding connection object sent to the software component in response to the request to obtain the database connection can be intercepted 910 by the same or a different agent. Similarly, a database query request from the software component can be intercepted 915 that includes, for instance, a database query statement. Result data from the database provided in response to the database query can likewise be intercepted 920 by a same or a different agent. Other requests and responses involved in one or more transactions (including sessions and conversations between the software component and database) can also be intercepted.

The agent(s) can generate frame data 925 that includes one or more frames. The frame data can describe the connection request, connection object, database query, query results, requests to step through a pointer-based result set, etc. The frame data can also include information describing the context in which a particular request or response was sent or received. Such context information can be used to establish the flow of the transaction fragments, relationships between the fragments (e.g., whether they correspond to the same database connection, user session, etc.), and so on. In some instance, a separate frame can be generated by an agent for each intercepted fragment of the transaction. In other cases, a single combined frame can be generated describing multiple fragments that have been identified (e.g., by the agent) as being related, for instance, because they are fragments within the same session and/or connection. The frame(s) can then be sent to a virtualization system. The virtualization system can interface with multiple different agents instrumented on multiple different software components, applications, servers, etc.

Turning to the example of FIG. 9B, an example virtualization system can receive data (such as frame data) from an agent describing one or more transactions that have been recorded between a software component and a database. One or more frames may be received describing information captured by one or more agents monitoring the transaction(s). For instance, a request to open or otherwise obtain a database connection can be received 930, as well as data (at 935) describing a connection object, detected by an agent, sent in response to the request to obtain the database connection. Further, data can be received 940 from an agent describing a database query request captured by the agent. Data can also be received 945 from an agent describing a result set returned for the database query. The data can be received by one or more agents instrumented on and accessing information sent and received by the software component. Other frames can also be received for any other requests and responses sent between the software component and a database access component used by the software component to access the database. The received data can be used by the virtualization system to generate 950 at least a portion of a service model that models the transaction(s) between the software component and the particular database. Multiple different service models can be generated. The service models can each pertain to a separate transaction or set of transactions involving the database and any one of several different software components or the specific combination of the software component and the database, among other examples. A virtual service simulating the database (as viewed through database access component by the software component(s)) can be instantiated using the generated service model. The virtual service can stand-in for the database, for instance, when it is unavailable. The agents instrumented on the software component can be utilized, in some cases, to implement the virtual service.

FIGS. 9C-9D are simplified flowcharts 900*c-d* illustrating example techniques involved in the virtualization of transactions with an example database. The virtualization can be based, for instance, on a service model generated, such as described in the examples of FIGS. 9A-9B. In the example of FIG. 9C, a particular request from a software component to a database (through a database access component) can be intercepted 955. The context of the particular request can be detected 960 from the particular request itself and/or from data internal to (and accessible by the agent in) the software component. Such context information can relate to or identify a user session or database connection in which the request was sent, forwarded, or generated, among other examples. Frame data can be generated that describes the particular request, including its type, attributes, additional context information, etc. The frame data describing the particular request can be sent 965 to a virtualization system interfacing with the agent. The agent (or another agent also instrumented on and capable of delivering synthetic, or virtual, responses to the software component) can receive 970 virtualization data generated by the virtualization system. The virtualization data can be based on a service model defining transactions observed between software components and the database. The virtualization data can describe a virtual response to be provided (and in some cases generated) by the agent to the software component in lieu of actual responses generated through the database access components interaction with the database.

In the example of FIG. 9D, frame data can be received 975 from an agent that describes a particular request intercepted by the agent that involves a particular database. The frame data can identify the database and describe the type and attributes of the request. The frame data can also identify the context in which the particular request was detected. Information included in the frame data describing the characteristics of the particular request can be used by a virtualization system to identify a particular one of a plurality of service models that models transactions with the particular database and corresponds to the particular request. For instance, the virtualization system can identify that the particular request is a fragment of one or more transactions defined in the particular service model. The service model can define how to generate synthetic, or virtual responses, to requests such as the particular request described in the frame data. For instance, responses can be defined in the identified service model that include a set response structure with some variants dependent on such factors as attributes of the particular request (e.g., a user ID, product ID, connection ID, or other variable included in the request), the context of the request (e.g., the session, conversation state, etc.), and so on. The defined responses for the particular request can be based on one or more recorded instances of transactions involving responses similar to the particular request. Accordingly, virtualization data can be generated 985 that is based on the service model and, potentially also, the characteristics of the particular request (e.g., variant attributes, context, etc.), the virtualization data describing a virtual response to be provided to the software component for the particular request during virtualization of the database. The virtualization data can be sent 990 to the agent, such as the agent that is to provide the virtual response to the software component. The agent can provide the virtual response to the software component such that the software component interprets the virtual response as being a real response received from the database access component it uses to access the virtualized database.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
    identifying a first request from a software component to a database access component, wherein the first request is passed from the software component to the database access component through an agent instrumented on the software component, and the software component interfaces with the database using the database access component;
    determining that the database is to be virtualized in a virtualization mode;
    intercepting, at the agent, during the virtualization mode, a second request from the software component to the database access component, wherein the second request corresponds to a transaction involving the database, and interception of the second request causes handling of the second request to be redirected from the database access component to a virtual service implemented, at least in part, using the agent and a virtualization system;
    sending frame data from the agent to the virtualization system describing the second request;
    receiving virtualization data, at the agent, describing a virtualized response to provide to the software component responsive to the second request, wherein the virtualized response simulates a response of the database access component; and
    providing, through the agent, the virtualized response to the software component in lieu of the response from the database access component.

2. The method of claim 1, wherein the virtualization data comprises the virtualized response.

3. The method of claim 1, further comprising:
    identifying a session corresponding to the particular request, wherein the frame data comprises an identification of the session and the virtualization data is based on the identification of the session.

4. The method of claim 1, wherein the particular request comprises a database query statement, the method further comprising identifying a particular connection with the database corresponding to the particular request.

5. The method of claim 4, wherein identifying that the particular connection corresponds to the particular request comprises identifying from session data that the particular request and the particular connection correspond to a particular session involving the database.

6. The method of claim 5, wherein the particular request comprises the session data.

7. The method of claim 5, wherein the session data is identified from data maintained by the software component.

8. The method of claim 4, further comprising intercepting, at the agent, a database connection object corresponding to the particular connection and sent in response to a request of the software component to obtain a connection with the database.

9. The method of claim 1, wherein the virtualized response is to be provided in lieu of a response from the database access component to the particular request and is to model responses of the database interfacing with the software component through the database access component.

10. The method of claim 1, wherein the particular request comprises a data retrieval request and the virtualized response is to model a portion of query results returned to the software component by the database access component.

11. The method of claim 10, wherein the query results comprise one of scalar-based results and pointer-based results.

12. The method of claim 1, wherein the particular request comprises a request to obtain a connection with the database and the virtualized response is to model a connection object returned for a connection with the database.

13. The method of claim 1, wherein the particular request comprises a query statement and the virtualized response is to model a query result set returned from the database based on the query statement.

14. The method of claim 1, wherein the database access component comprises a database API from a group comprising a Java Database Connectivity (JDBC) driver, an ADO.NET driver, an Object Linking and Embedding Database (OLDEDB) driver, and an Open Database Connectivity (ODBC) driver.

15. A method comprising:
receiving frame data from an agent instrumented on a software component, the frame data describing a particular request from the software component to a database access component intercepted at the agent during a virtualization mode, wherein the particular request corresponds to a transaction involving a database, the software component interfaces with the database using the database access component, and the particular request is intercepted by the agent to prevent the particular request from being handled by the database access component during the virtualization mode, wherein the agent is to allow requests to be handled by the database access component when in a default operating mode;
identifying a particular one of a plurality of service models as corresponding to the transaction;
generating virtualization data based on the service model and the particular request; and
sending the virtualization data to the agent, wherein the virtualization data describes a virtualized response to be provided by the agent to the software component as a response to the particular request, wherein the virtualized response simulates a response of the database access component and is sent in lieu of an actual response by the database access component to the particular request.

16. The method of claim 15, further comprising determining a type of the transaction from the frame data, wherein the service model is identified based on the type.

17. The method of claim 15, further comprising determining that the particular request corresponds to a set of stateful transactions modeled by a conversation model, wherein the virtualization data is based on the conversation model.

18. The method of claim 17, further comprising identifying from the frame data that the particular request corresponds to a particular session involving the database, wherein determining that the particular request corresponds to the set of stateful transactions is based on identifying that the particular response corresponds to the particular session.

19. The method of claim 15, further comprising identifying from the frame data that the particular request corresponds to a particular connection with the database.

20. The method of claim 19, wherein the frame data comprises first frame data and the virtualization data comprises first virtualization data, the method further comprising:
receiving second frame data describing a request of the software component to obtain the particular connection; and
generating second virtualization data based on the service model and the particular request; and
sending the second virtualization data to the agent, wherein the second virtualization data describes a virtual connection object to be provided by the agent to the software component as a response to the request to obtain the particular connection.

21. The method of claim 15, wherein the particular request comprises a data retrieval request and the virtualized response is to model a portion of query results returned to the software component by the database access component.

22. The method of claim 15, wherein the particular request comprises a request to obtain a connection with the database and the virtualized response is to model a connection object returned for a connection with the database.

23. The method of claim 15, wherein the particular request comprises a query statement and the virtualized response is to model a query result set returned from the database based on the query statement.

24. The method of claim 15, further comprising:
determining that the database is unavailable and is to be virtualized; and
causing the virtualization mode to be entered based on unavailability of the database.

25. The method of claim 15, further comprising receiving a request to virtualize the database.

26. A non-transitory computer readable medium having program instructions stored therein, wherein the program instructions are executable by a computer system to perform operations comprising:
identifying a first request from a software component to a database access component, wherein the first request is passed from the software component to the database access component through an agent instrumented on the software component, and the software component interfaces with the database using the database access component;

determining that the database is to be virtualized in a virtualization mode;

intercepting, at the agent, a second request from the software component to the database access component, wherein the second request corresponds to a transaction involving the database, and interception of the second request by the agent prevents the second request from being handled by the database access component;

sending frame data from the agent to a virtualization system describing the second request;

receiving virtualization data, at the agent, describing a virtualized response to provide to the software component responsive to the second request, wherein the virtualized response simulates a response of the database access component; and providing, through the agent, the virtualized response to the software component in lieu of the response from the database access component.

27. A non-transitory computer readable medium having program instructions stored therein, wherein the program instructions are executable by a computer system to perform operations comprising:

receiving frame data from an agent instrumented on a software component, the frame data describing a particular request from the software component to a database access component intercepted at the agent during a virtualization mode, wherein the particular request corresponds to a transaction involving a database, the software component interfaces with the database using the database access component, and the particular request is intercepted by the agent to prevent the particular request from being handled by the database access component during the virtualization mode, wherein the agent is to allow requests to be handled by the database access component when in a default operating mode;

identifying a particular one of a plurality of service models as corresponding to the transaction; and sending virtualization data to the agent, wherein the virtualization data describes a virtualized response to be provided by the agent to the software component as a response to the particular request, wherein the virtualized response simulates a response of the database access component and is sent in lieu of an actual response by the database access component to the particular request.

28. A system comprising:
a processor device;
a memory element; and
a virtualization system to:

receive frame data from an agent instrumented on a software component, the frame data describing a particular request from the software component to a database access component intercepted at the agent during a virtualization mode, wherein the particular request corresponds to a transaction involving a database, the software component interfaces with the database using the database access component, and the particular request is intercepted by the agent to prevent the particular request from being handled by the database access component during the virtualization mode, wherein the agent is to allow requests to be handled by the database access component when in a default operating mode;

identify a particular one of a plurality of service models as corresponding to the transaction;

generate virtualization data based on the service model and the particular request; and send the virtualization data to the agent, wherein the virtualization data describes a virtualized response to be provided by the agent to the software component as a response to the particular request, wherein the virtualized response simulates a response of the database access component and is sent in lieu of an actual response by the database access component to the particular request.

29. The system of claim 28, wherein the virtualization system is further to generate the service model based on frames received from agents instrumented on the software component describing transactions involving the database.

* * * * *